(12) United States Patent
Tomic et al.

(10) Patent No.: US 7,475,093 B2
(45) Date of Patent: Jan. 6, 2009

(54) MEMORY CACHE MANAGEMENT IN XML/RELATIONAL DATA MAPPING

(75) Inventors: Dragan Tomic, Redmond, WA (US); Shankar Pal, Redmond, WA (US); Stanislav A. Oks, Kirkland, WA (US); Jonathan D. Morrison, Woodinville, WA (US); Mark C. Benvenuto, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 306 days.

(21) Appl. No.: 11/185,310

(22) Filed: Jul. 20, 2005

(65) Prior Publication Data

US 2006/0085489 A1    Apr. 20, 2006

Related U.S. Application Data

(60) Provisional application No. 60/619,131, filed on Oct. 15, 2004.

(51) Int. Cl.
*G06F 12/00*    (2006.01)
(52) U.S. Cl. .................... 707/200; 709/217; 711/3; 711/117

(58) Field of Classification Search ................ 707/200; 709/221, 217
See application file for complete search history.

(56) References Cited

U.S. PATENT DOCUMENTS

| 4,742,447 | A  | * | 5/1988  | Duvall et al. ................... 718/1 |
| 6,377,993 | B1 | * | 4/2002  | Brandt et al. ............... 709/227 |
| 6,631,402 | B1 | * | 10/2003 | Devine et al. ............... 709/217 |
| 7,146,422 | B1 | * | 12/2006 | Marlatt et al. ............... 709/227 |
| 2003/0140128 | A1 | * | 7/2003  | Cox et al. .................... 709/221 |
| 2003/0163479 | A1 | * | 8/2003  | Mathews et al. ............. 707/102 |
| 2004/0143646 | A1 | * | 7/2004  | Klubertanz ................. 709/219 |
| 2004/0193576 | A1 | * | 9/2004  | Petculescu et al. ............. 707/3 |
| 2004/0193807 | A1 | * | 9/2004  | Mogi et al. ................. 711/137 |

* cited by examiner

*Primary Examiner*—Pierre M Vital
*Assistant Examiner*—Truong V Vo
(74) *Attorney, Agent, or Firm*—Amin, Turocy & Calvin, LLP

(57) ABSTRACT

Caching architecture that facilitates translation between schema data and relational structures. A schema translation component consumes schema data (e.g., XML schema data) having a schema structure. The schema structure is shredded into tables. A validation component interfaces to a memory management interface to facilitate loading only the necessary components to perform instance validation. During validation, only parts of the schema that are used are loaded and cached. A schema cache stores the in-memory representation of the schema optimized for instance validation. The schema components are loaded from metadata into the cache memory as read-only objects such that multiple users can use the in-memory objects for validation.

16 Claims, 14 Drawing Sheets

MEMORY CACHE MANAGEMENT IN XML/RELATIONAL DATA MAPPING

CROSS-REFERENCE TO RELATED APPLICATIONS

This application claims the benefit of U.S. Provisional Patent application Ser. No. 60/619,131 entitled "MEMORY CACHE MANAGEMENT IN XML/RELATIONAL DATA MAPPING" and filed Oct. 15, 2004, the entirety of which is incorporated by reference herein.

BACKGROUND

The XML (eXtended Markup Language) provides a standard way of tagging data so that the data can be read and interpreted by a variety of Web browsers. Given the enormous proliferation of web hosts and applications on global communications networks such as the Internet, XML documents are used extensively in daily transactions.

Document Type Definition (DTD) is one technology that defines the document structure of an XML document according to a list of legal elements or building blocks. From a DTD perspective, all XML documents (and HTML documents) are made up by the following simple building blocks: Elements, Tags (used to markup elements), Attributes (used to provide extra information about elements), Entities (variables used to define common text), PCDATA (Parsed Character Data), and CDATA (Character Data). Elements are the main building blocks of XML documents. Examples of XML elements could be "note" and "message." Elements can contain text, other elements, or be empty.

XML Schema is a W3C (World Wide Web Consortium) standard that defines a schema definition language for an XML data model. Schema definitions (e.g., a type definition such as CustomerType that describes the structure of information regarding each Customer) can be used to validate the content and the structure of XML instance documents. The XML Schema document is an XML document that is expressed in a different way than the tables and columns of a relational database system. The type information supplied in an XML Schema document can also be used to check XML queries for correctness, and optimize XML queries and XML storage.

XML Schema provides a more robust replacement to DTD technology to include the following: XML Schema is extensible to future additions to allow extending or restricting a type definition; XML Schema is richer and more useful than DTD to allow, for example, the capability to define user-defined types; XML Schema is written in XML; XML Schema supports data types; and XML Schema support namespaces. Unlike DTD, XML Schema provides separation between type and element definitions, so that multiple elements (e.g., LocalCustomer and DistantCustomer) of the same type can be defined using a common type definition (e.g., CustomerType). An XML Schema document can import other XML Schema documents, thereby setting up a type library system.

Having the capability to store XML Schema documents in relational structures has at least the following advantages: type definitions can be searched efficiently using relational index structures (instead of parsing the XML Schema documents); appropriate pieces of the XML Schema documents (e.g., only CustomerType definition) can be selectively loaded into memory buffers for validations of XML instances, which provides a significant performance improvement; and SQL (Structured Query Language) views can be provided on the relational storage for relational users to know about stored XML Schema documents. Thus, here is a substantial unmet need for a technique that provides improved caching of metadata tables for translation of XML Schema data into a relational database structure.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Disclosed and claimed herein, in one aspect thereof, is provided a common XSD (XML Schema Definition) type cache framework (also called schema cache) that is implemented in support of performance and resource utilization needs. The common cache framework provides encapsulation of internal system structures, as well as a common interface for consumers of the caches. Caches that can leverage the common cache framework include an HTTP (Hypertext Transfer Protocol) cache, an LPE cache, metadata cache, XML schema cache, and optimizer cache for table views.

The compiling of content models is extremely memory and I/O intensive. For example, a type with several facets, few elements and few attributes would require lookup to many (20-50) metadata objects. While loading parts of XML schema definition is already an improvement over most commercial applications, caching improves data access due to high concurrency requirements placed on the SQL Server.

Because XML schemas are shredded into many relational tables only the most frequently used pieces of schema can be selectively loaded and cached. Furthermore, since the relational layout of XML schemas includes several primary and secondary indexes, the loading of schemas will also be fast.

Once the required schemas are located in relational tables, only the parts relevant to Type, Attribute, or Element definition will be added to the XSD type cache as needed. In the implementation, a reverse mechanism from the schema import is used: first, a symbol table is created, and then, validation structures are derived that are cached.

For caching, the SQL Server caching framework is used which keeps the most active entries in memory while less frequently used entries are removed periodically. In addition, the mechanism for cache cleanup is driven by the memory pressure currently present on the system. If the system is overloaded, entries will be more aggressively removed from the cache. The algorithm for cache cleanup also takes into consideration the number of I/O reads required to compute the entry and the total memory required to compute the cache entry.

A final property of relational representation of XML schemas is a performance benefit due to the indexes built on XML schema component tables and other schema tables for fast retrieval of the XML schema components. Inheritance of XML schema types can be efficiently checked. Inheritance checking is used in several parts of SQL Server, mainly during data import and for XQuery type checking and casting.

Because XML schemas are shredded into tables, XML instance validation loads only the necessary components to perform validation. During validation, only parts of the schema that are used are loaded and cached. The "Schema Cache" stores the in-memory representation of the XML schema optimized for XML instance validation. XML schema components are loaded from metadata into main memory as read-only objects such that multiple users can use the in-memory objects for validation. If the XML schema is changed during the operation, the schema cache entries are invalidated. Additionally, if the database server is under heavy load, unused schema cache entries are unloaded. In view of the above novel capabilities, a scalable system is provided that can operate in large enterprise environments involving thousands of XML schema components and supporting many concurrent users.

In another instance, a view component facilitates viewing internal data in a read-only manner.

In yet another instance thereof, an artificial intelligence component is provided that employs a probabilistic and/or statistical-based analysis to prognose or infer an action that a user desires to be automatically performed.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
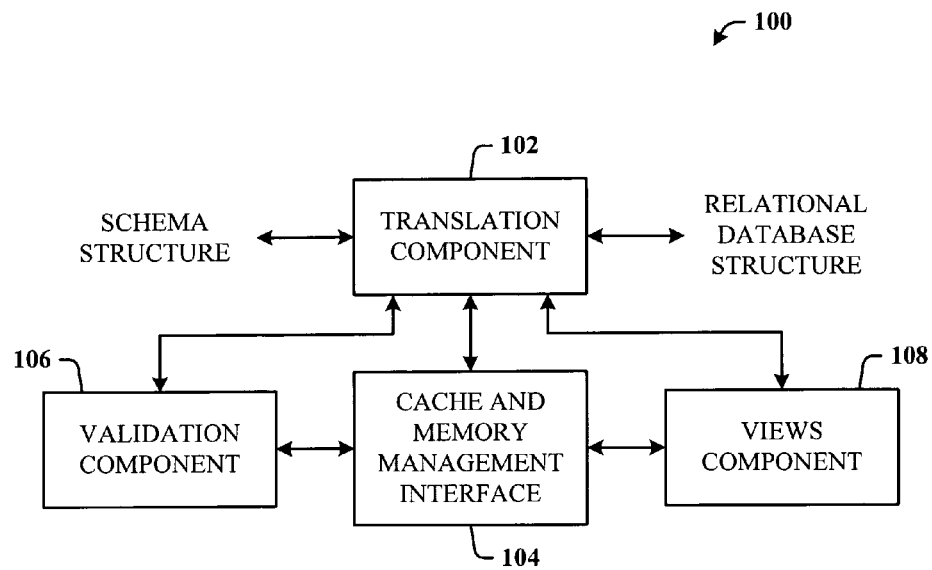
FIG. 1 illustrates a system that facilitates translation with cache and memory management in accordance with an instance.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

With respect to internal cache storage of XML schemas, an XSD (XML Schema Definition) type cache (also called herein a schema cache) is implemented in support of performance and resource utilization needs. Compiling content models is extremely memory and I/O intensive. For example, a type with several facets, few elements and few attributes would require a lookup to many (e.g., 20-50) metadata objects. While loading parts of XSD is already an improvement over most commercial applications, caching improves data access due to high concurrency requirements placed on the server (e.g., an SQL Server). Note that although the following description is in the context of an SQL server, it is to be understood that other suitable server architectures can benefit from the disclosed cache management mechanism.

The input schemas (e.g., XML) are shredded into many relational tables and only the most frequently used pieces of schema can be selectively loaded and cached. Furthermore, since the relational layout includes several primary and secondary indexes, the loading of schemas will also be fast. Because XML schemas are shredded into tables, XML instance validation loads only the necessary components to perform validation. During validation, only parts of the schema that are used are loaded and cached. The schema cache stores the in-memory representation of XML schema optimized for XML instance validation. XML schema components are loaded from metadata into main memory as read-only objects such that multiple users can use the in-memory objects for validation. If the XML schema is changed during the operation, the schema cache entries are invalidated. Additionally, if the database server is under heavy load, unused schema cache entries are unloaded. In view of the above novel capabilities, a scalable system is provided that can operate in large enterprise environments involving thousands of XML schema components and supporting many concurrent users.

Once the required schemas are located in relational tables, only the parts relevant to Type, Attribute, or Element definition will be added to the XSD type cache. In implementation, a reverse mechanism from the schema import is used: first, a symbol table is created, and then, validation structures are derived that are cached.

For caching, the SQL Server caching framework is used which keeps the most active entries in memory while less frequently used entries are removed periodically. In addition, the mechanism for cache cleanup is driven by the memory pressure currently present on the system. If the system is overloaded, entries will be more aggressively removed from the cache. Consumers that cannot utilize the common interface can be written to automatically and give up memory when memory pressure notification is received. The algorithm for cache cleanup also takes into consideration the number of I/O reads required to compute the entry and the total memory required to compute the cache entry.

A final property of relational representation of XML schemas is a performance benefit due to the indexes built on XML schema component tables and other schema tables. Inheritance of XSD types can be efficiently checked. Inheritance checking is used in several parts of SQL Server, mainly during data import and for XQuery casting.

FIG. 1 illustrates a system 100 that facilitates translation with cache and memory management, and internal views thereof. A translation component 102 provides translation capabilities by decomposing a schema structure (e.g., an XML schema) into tables of metadata that can be selectively accessed to facilitate interfacing of XML data to a relational data structure. A user provides data that conforms to the XML schema. The system 100 validates that the user-supplied data actually conforms to the XML schema. In other words, a database engine looks at both the user-supplied data and the schema, and determines how to efficiently validate the data. The data is not being stored in a native or raw binary form. A cache memory and memory management interface (MMI) component 104 facilitates storing the tables of metadata in the cache memory for rapid access of only necessary XML components. A validation component 106 facilitates loading and caching only parts of the schema that are used. A views component 108 allows a user to view the internal metadata tables in a tabular format. Note that although cache and memory management is described in FIG. 1 with respect to an input XML schema to relational mapping, the disclosed caching management architecture is not restricted thereto, but finds application of the translation between any input schema and relational structure.

With respect to global pointers, a file xmldbcache.cpp implements CXmldbCache. CXmldbCache is a static class with several methods and three members. Each member is a SOS (SQL Operating System) Cache Store. This is but one implementation of the subject invention. Other suitable implementations are within contemplation of the disclosed innovation. Cache store is described in detail infra.

With respect to hash tables and hash entry keys, three types of cache stores are utilized (types, attributes, elements). Each cache store has a lookup by name. In addition, type cache store has by id lookup. Hash key contains (name/dbid for attributes and elements) and (name/dbid/tid for types). If a match occurs, first verified is that database and namespace versions are consistent and, if versions are consistent, the value found is returned in the cache to the user. Otherwise, a new cache entry is created using the APIs (Application Programming Interfaces) on CSymtabConverter.

CXsdTypeInfo, CXsdElementInfo and CXsdAttributeInfo are cached classes. Not all classes of the above mentioned types have cache entries. For example, anonymous types or local elements and attributes are not cached, but contained within their respective types/elements and attributes. Additionally, the mentioned classes have an FCached( ) method which indicates if the class has a cache entry or not. This is important during reference releasing, since only items with cache entries can be released to Cache Store.

During DDL (Data Definition Language) (CREATE, ALTER and DROP XML SCHEMA COLLECTION) the meta-data version number on the XML schema collection is changed during DDL import or DDL drop. This will invalidate any existing cache entries for the XML schema collection. In one implementation, if a database version change is detected the whole cache is flushed.

For reference management purposes, three CAuto* classes are added. Auto classes release cache references when going out of scope. In addition, any client of CXmlValidator calls a destructor of that class. During the execution of the destructor of CXmlValidator, the state stack is walked and cache entries released for each CValidationState. Each CValidationState can contain the following cache references: type reference, element reference, and multiple attribute references (for anyAttribute).

With respect to cache store usage, entries are inserted into the cache store using CacheUserDataExclusive. This internal API is used to prevent multiple users from creating identical cache entries. If a duplicate cache entry is detected, the SOS layer will return SOS_DUPLICATE and a pmo (a data structure for allocated memory) is released. All cache entries have a single incremental memory object (PMO) associated therewith. When the cache entry is inserted, a cost is automatically calculated based on number of context switches and number I/Os (Input/Output operations). A destroy method is not associated with the cache entries. A NULL is passed for a destroy function pointer. This forces the SOS to release memory objects of cache entries without any specific cleanup.

Following is a set of requirements, analysis, and architectural overview of a cache and other infrastructures that allow dealing with large memory consumers. This describes an internal software architecture for cache infrastructure and memory manager client interface. Initially, a set of internal and external requirements imposed on the memory management subsystems is outlined, followed by analysis of the requirements. It continues with proposing different design alternatives and discusses their pros and cons. Further on it picks up a design and fully outlines design of a cache framework and outlines its architecture. The description finishes by outlining a memory manager client interface that can be used by clients that are not suited for a caching framework but still might consume significant amounts of memory.

For DBMS (Database Management Systems) it is highly desired to have maximum available memory available for the data buffers. Memory consumers other than the buffer pool cannot afford to allocate memory and keep the memory for a long time without releasing it, especially when it is not in use. Thus, there are needed mechanisms which will be capable of aging memory that is not currently in use and give it back to the buffer pool.

In one version of the SQL Server there is only one cache: a procedure cache. This cache has been tightly coupled with buffer pool implementation, and relies on the same aging mechanism as the data pages. The procedure cache relies on the internal buffer pool structures.

When employing a set of new features, the amount of components that could leverage the cache framework expands. The components that use caches are unrelated and external to the buffer pool. Thus, no longer can different caches be made to "understand" the internals of the buffer pool, since it would break encapsulation and layering decomposition which is very important for maintenance of the code base.

A common cache framework can provide encapsulation of internal system structures, as well as provide a common interface for consumers using caches. This solves maintenance problems, as well as adding new caches will be just a matter of using the common interface.

However there are still some consumers that will not be able to leverage caching interfaces. These consumers need to be written in such way that they themselves need to be able to give up memory upon memory pressure notification.

Figure 2:
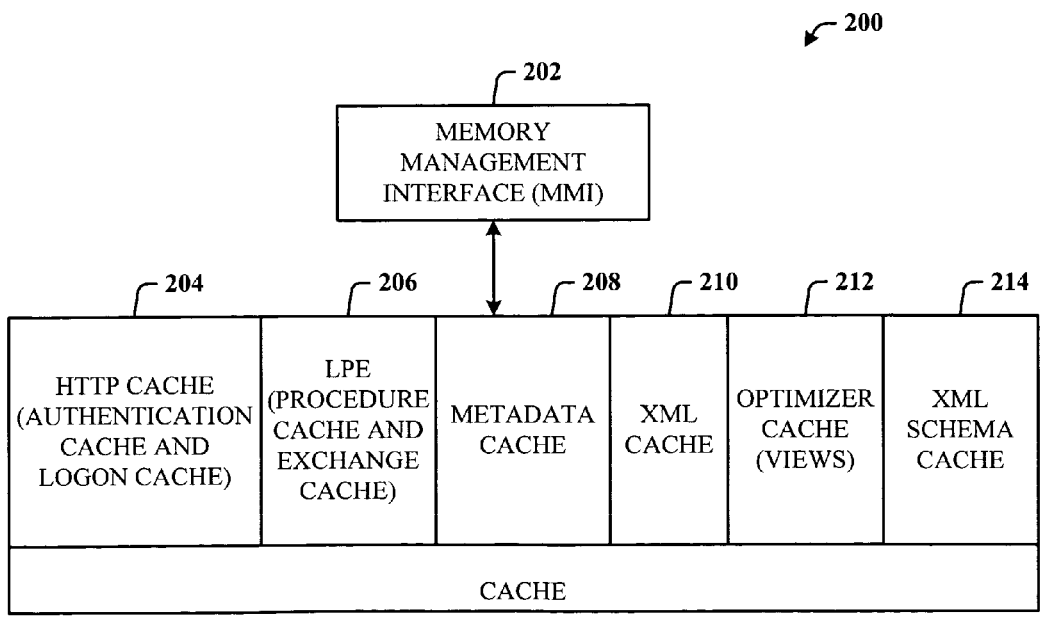
FIG. 2 illustrates a block diagram of different types of caches and associated memory management interface (MMI) that can be employed.
Figure 4:
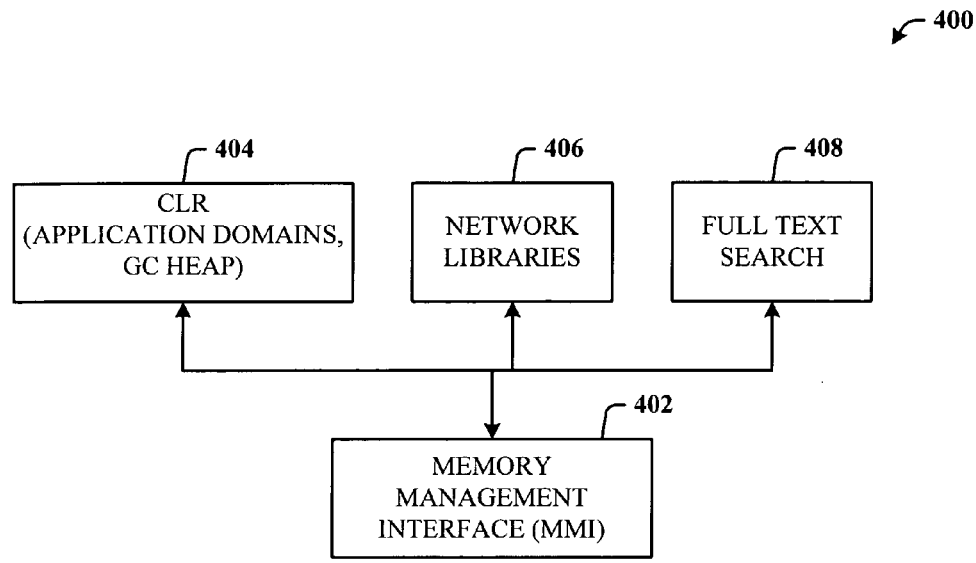
FIG. 4 illustrates a block diagram of components that leverage the MMI.

FIG. 2 illustrates a block diagram 200 of different types of caches and associated MMI 202 employed. The following list of components can leverage the common caching framework: an HTTP (HyperText Transfer Protocol) cache 204, an LPE (Log Predictive Error) procedure cache 206, a Metadata cache 208, an XML cache 210, an Optimizer cache 212 for table views, and an XML schema cache 214. The components that will leverage the MMI 202 are a CLR (common language runtime), Network Libraries and Full Text search, as illustrated in FIG. 4

Figure 3:
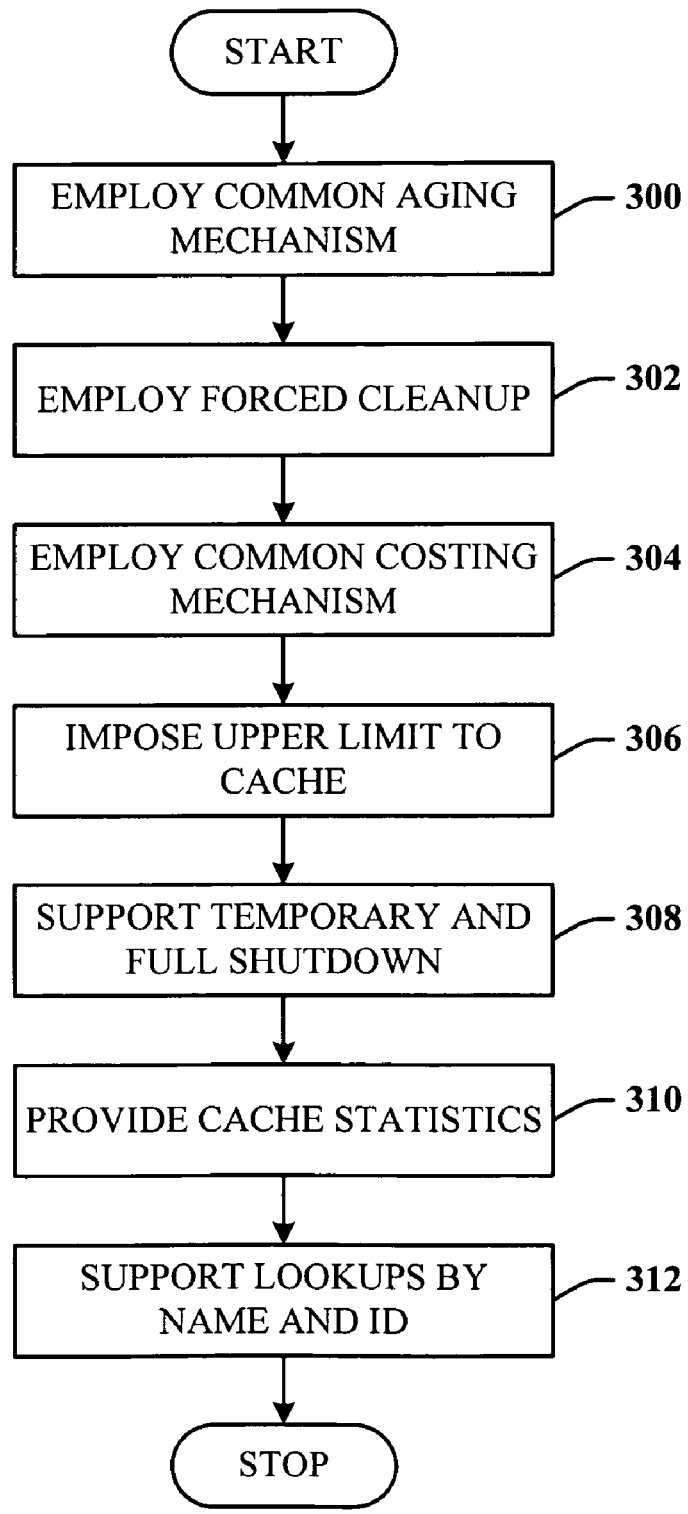
FIG. 3 illustrates a set of collected requirements that are imposed on the cache mechanism and MMI in accordance with an innovative aspect.

FIG. 3 illustrates a methodology of imposing a set of collected requirements on the cache mechanism and MMI in accordance with the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

A general set of requirements can be imposed on the cache framework by the overall memory management infrastructure in SQL server. At 300, all caches participate in the common aging mechanism. At 302, caches are not allowed to keep unused data permanently, and thus, all caches support forced cleanup. In the case of memory pressure it can be required that all cached memory should be returned back to the buffer pool memory manager.

At 304, to implement aging correctly, all caches employ a common costing mechanism that expresses costing in the same quantities. At 306, all caches should not grow without bounds, thus, there is a limiting factor. Support for temporary and full shutdown by dynamically disabling it is provided in the case when cache does not perform well and becomes troublesome, as indicated at 308. At 310, all caches should support statistics information such as amount of memory used and memory fragmentation factor. At 312, lookups in the cache can be performed in at least two ways: lookup by name and lookup by id.

The LPE layer in SQL Server has two caches: a procedure cache and a parameter exchange cache. The procedure cache can be used to cache compiled plans for execution. The entry data size can be defined by a size of a compiled plan. The average size of the compiled plan is about 1.5 Kb. Cache size can depend on the load of the system as well as on a number of queries running. The cache size can be bounded by a current aging mechanism. For previous versions of SQL Server, each compiled plan can be allocated from a designated memory object.

The disclosed architecture supports single statement recompile, which forces creation of a memory object per statement. Basically, complex plans can have multiple memory objects from which they are allocated. A current costing mechanism is based on a number of generated I/O and CPU time required to generate a plan. Lifetime of the entry in the cache can be defined by usage and its cost. A parameter cache is used to cache parameter information for remote procedure calls (RPCs).

The entry size can range from about 256 B to about 16 Kb. The cache size can depend on the load of the system and number of existing parameters. In one implementation, cache size can be bounded by an aging mechanism. Each entry is allocated out of its own Memory Object. A costing mechanism can be based on CPU requirements to create an object. Lifetime of the entry in the cache can be defined by usage and its cost.

The HTTP cache 204 of FIG. 2 has two different kinds of caches: an authentication cache, and a logon cache. The authentication cache is used to cache authentication information for an HTTP connection. The entry data size is defined by the authentication protocol used, and can range from about 128 B to about 5 Kb. The cache size can depend on the number of users and the number of protocols used. In one implementation, all entries are allocated out of a single Memory Object. A costing mechanism can be based on CPU time required to generate authentication information. Lifetime of the entry in the cache can be defined by usage and its cost.

The logon cache is used to cache logon information, as well as session objects such as pss and srvproc. The usual requirements to store login information are about 16 Kb+(8 Kb for two input buffers, 4 Kb for output buffer+smaller objects such as ExecutionContext). The cache size can depend on the number of users. Each entry can be allocated out of the designated memory object. The costing mechanism can be based on CPU time required to generate login information. The lifetime of the entry in the cache can be defined by usage and by its cost.

The MetaData cache 208 of FIG. 2 has a set of hash tables that are used to cache metadata information. This cache 208 is used to cache metadata information such as types, objects, assemblies and/or XML information. Each hash table caches objects of the specific type. The entry data size can be defined by the type of the information, which is typically about 20 B. The cache size depends on the number of types, objects, assemblies and XML information. In one implementation, all entries are allocated out of single memory object. It is possible to group related objects together and allocate them from a designated memory object. The costing mechanism can be based on CPU and I/O time required to generate metadata information. Lifetime of the entry in the cache can be defined by usage and its cost. If objects are grouped together, then they can be created or destroyed together based on the usage and its cost.

Once XML schema are parsed, types defined in the schema are put into the XML schema cache. Each type belongs to a specific namespace. The entry, schema type, can be from about 256 B to an undefined size. The cache size depends on the number of used types in all namespaces. In one implementation, all entries are allocated out of a single memory object. In one implementation of support for memory objects with pages of less than 8 Kb, it is possible to convert to one memory object per type. The costing mechanism can be based on CPU and I/O time required to extract type information. The lifetime of the entry in the cache can be defined by usage and its cost.

FIG. 4 illustrates a block diagram of components that can leverage the MMI. The components that will leverage the MMI 202 of FIG. 2 are the CLR, network libraries and full text search components, as illustrated in FIG. 4. The CLR has two major components that can be leveraging the MMI to respond to memory pressure: application domains, and garbage collected (GC) memory. One component, application domains, can be large memory consumers. Application domains are loaded on demand, and can be unloaded, once they are not in use. The entry data size for application domains is on average about 1 MB. The number of loaded application domains is restricted by an amount of Virtual Memory. In one implementation, the CLR can be allocated externally to the SQL server's memory management mechanism. In another implementation, the CLR will be converted to use the memory management mechanism of the subject innovation. Lifetime of the entry in the cache can be defined by usage and its cost.

With respect to network libraries page pool, to perform network reads and writes, network libraries can require memory pages that are multiples of OS page sizes. Page size can be different depending on the client configuration. The pool size can depend on the activity of the clients, and the page size configuration. In one instance, network libraries allocate a page directly from the OS and keep a pool of free pages. The pages are usually affinitized to either a scheduler or a network card. There is no real costing. Under memory pressure, network libraries can shrink their pools. The lifetime of the page in the free pool can be defined by current memory pressure.

Full text search uses shared memory regions to communicate with MS Search. In one instance, the shared memory region is a multiple of 64K; however, it can be of any size depending on the memory pressure. Full text search allocates virtual memory regions directly from the OS and maps them as shared memory regions. There is no real costing. Under memory pressure, full text search can shrink its regions. With respect to lifetime, regions can be shrunk under memory pressure.

Following is a table that summarizes many of the cache types.

| Cache Name or Memory Consumer Name | Entry Data Size | Cache Size | Allocation Mechanism | Costing | Lifetime |
| --- | --- | --- | --- | --- | --- |
| Procedure Cache | 1.5 KB | Unlimited | Memory object per entry | CPU + I/O (Disk) | Cost + usage |
| Parameter Exchange | 256 B-15 KB | Unlimited | Memory object per entry | CPU | Cost + usage |
| Authentication | 128 B-5 KB | Unlimited | Memory object for whole cache | CPU + I/O (External) | Cost + usage |
| Logon | 16+ KB | Unlimited | Memory object per entry | CPU + I/O (Network) | Cost + usage |
| Metadata | 20 B | Unlimited | Memory object per group of entrees | CPU + I/O (Disk) | Cost + usage |
| Application domain | 1 MB | Unlimited | External (internal memory object) | CPU + I/O (Disk External) | Cost + usage |
| XML Schema cache | 256-2 KB | Unlimited | Memory object per type | CPU + I/O (Disk) + I/O (Network) | Cost + usage |
| GC heap | x MB | Unlimited | Internal Memory Object | Size | Cost + usage + size |
| Network Libraries | Multiple of OS page size | Unlimited | Directly from OS | Size | Memory Pressure |
| Full Text Search | Multiple of 64K | Unlimited | Directly from OS | Size | Memory pressure |

The CLR has a second component, the GC memory, which can be considered as a heap. CLR objects can be allocated out of this heap. This heap could be shrunk through a mechanism called garbage collection, that is, reclaiming unused memory. The size of GC heap is limited by virtual and physical memory size. In one implementation, there are as many GC heaps as the number of CPUs in the system. In one instance, the CLR is allocated externally to the SQL server's memory management mechanism. In another instance, the CLR can be converted to the disclosed memory management mechanism. A costing mechanism can be based on GC heaps sizes and their usage. The GC heap cannot be discarded, but only can be shrunk.

Figure 5:
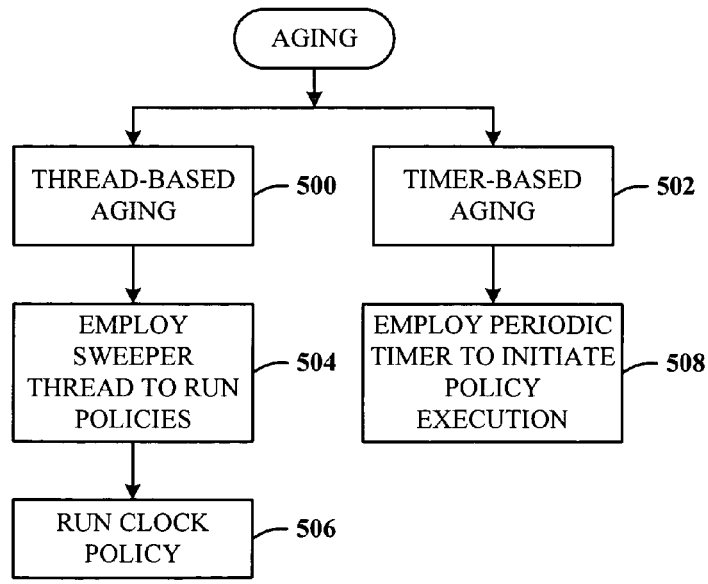
FIG. 5 illustrates different mechanisms that can be employed to address aging.

FIG. 5 illustrates different mechanisms that can be employed in accordance with an instance to address aging. The aging scheme could be implemented using several different ways. To differentiate between mechanisms and policies, mechanisms are skeletons and differ in base building blocks. Policies are algorithms, and produce results which do not depend on the mechanism but only on policies themselves. In this case, there are two major mechanisms that can be used: thread-based aging 500, and timer-based aging 502.

The thread-based aging mechanism 500 employs an extra thread, which is called a "Sweeper", indicated at 504. At 506, the sweeper thread runs a clock policy. With respect to the timer-based aging mechanism 502, there is no special thread allocated to run an aging scheme. However, there is a periodic timer, as indicated at 508. When the timer expires, any thread that is inside of the cache code can run policies.

Thread-based aging has major drawback of extra thread. The thread consumes extra resources such as memory and CPU. Since the stack of the thread should not be deep, memory resource consumption can be minimized by leveraging new thread APIs that allow creating threads with a reserved stack below the default.

Additionally, timer-based aging has several drawbacks. It requires timer polling which can be expensive, and in many cases, unnecessary. In addition, it requires that cache code should be constantly executed by consumers.

There are different policies that can be used to support aging. For example, LRU (least recently used), clock algorithm, MRU (most recently used), FIFO, and other policies have been vigorously studied in the industry and in the research community. One could find substantial amount of papers covering this subject.

To implement aging semantics for the cache framework, thread-based aging is selected using the clock policy.

Support can be provided for forced cleanup, statistics, upper limit, and temporary and full shutdown. These requirements can be handled by a storage provider cache store. The cache store can be implemented by client and/or by cache framework. In the case when cache store is implemented by the client there can be an interface between the cache framework and cache store. This interface can provide functionality to meet the requirements. A drawback of this approach is that the semantics become complex and needed to be very carefully stated. The interface specification would not only include methods but also the locking semantics to avoid concurrency problems. The interface can be designed very carefully; however, it still could be abused easily. For example, the removal of the object from the cache could easily cause deadlock depending on the component, client or sweeper thread, thereby instantiating removal. Moreover, development of new caches could require storage implementation. An advantage of this mechanism is flexibility. Depending on the cache, clients can use hash tables, arrays or other types of storage, which is independent of the cache framework.

In the case when the cache store is implemented by the cache framework there can be an interface that allows retrieving, invalidating, and creating new objects in the cache. Advantages of this mechanism include simplicity of the interface, all locking semantics are hidden from the client view, development of new caches is simple, and there is no need to implement one's own storage. Moreover, stated requirements could be satisfied by internal design of cache store. A major drawback of this approach is clients loosing flexibility in the implementation of storage mechanism. To implement the cache framework a cache store can be implemented that "lives" inside of the cache framework.

To be capable of aging out objects from caches, a common costing mechanism is supported for all caches. Different quantities can be considered such as a number of I/O or a number of instructions required to create an entry, memory usage by an entry, current memory pressure, etc. The following metrics can be chosen. Cost will be a function of the number of instruction required to create a cache entry, memory consumption by an object relative to the physical memory, and current memory pressure. Other metrics can be added as well. The metrics can be calculated by cache framework. However, the number of instruction could be provided by either client or by the cache framework. An advantage of the client providing the metric it is that it could be more accurate. On the other hand, the client could cheat and falsify the actual number of instructions. Thus, this could put this cache in favor of the other caches.

If the framework provides the instruction calculation, there is no way the client could cheat, however, it adds complexity into cache store layer and OS layer to keep track of this information. In one instance, a best of the both methods is chosen: the client will provide the number of instruction, however, the framework will provide assert facilities to catch the client's misbehavior.

There can be different alternatives to control the size of the cache object. Depending on the implementation, cache entries could be of a different size. To eliminate dependency of the cache store from external objects, cache objects can encapsulate memory objects or raw pages of the specified size. Since there is a requirement on the SOS layer to provide memory objects with page sizes lower than about 8K, this mechanism can be leveraged here as well.

Some components, such as network libraries, full text search and the CLR need pooling functionality only or have completely different semantics. It can be excessive to use the CacheStore interface for them. Thus, these components can leverage the Memory Manager Client interface and implement their own ways to react to memory pressure notifications.

In summary, different designed alternatives have been considered for the cache framework. The design is based on the sweeper thread that runs clock algorithm, using a costing function that depends on the number of instructions, memory usage, available physical memory and memory pressure. The cache framework will provide a storage for cache objects, and expose an interface to create and access cache stores as well as to manipulate with cache objects.

The sweeper thread, while sweeping through cache objects, will divide cost by 2 or a power of two, depending on the memory pressure. It will change the cost of the objects that currently are not in use. Once cost goes to zero, the object will be removed from the cache. While the object is in use, its cost does not change and it is not considered for removal. At the moment the object becomes not in use, its cost is set to the initial value, and the sweeper starts modifying with each clock.

The cache framework will be actually caching memory objects encapsulated under the Cache Object interface. The interoperability between cache store and sweeper thread will be fully hidden from the client. For components such as full text search and CLR, the memory manager will implement the interface through which it will feed notifications about memory pressure.

The framework can implement a special sweeper thread. One consideration is a sweeper thread per SOS node. Memory object design provides the capability to create memory objects with the size other than about 8K. The cache framework provides storage, and Cache Store for cache objects. Storage can be implemented using a hash table. The user supplies the compare function. There is no reason for the user to supply Cache Store with a hash function, since a hash value could be computed up front by the user. This approach avoids unnecessary call back. Note that there can be multiple hash tables supplied by Cache Store depending on the cache.

User-supplied compare functions can be implemented to decide whether the object could be accessed by multiple users. The cache framework can provide a way to enumerate existing cache stores, and dump statistics, debug and other possible information about the caches.

The cache framework can provide interfaces to create and configure cache stores, manipulate with cache objects, and enumerate cache stores. Cache object provides the consumer with a way to access the data stored in the cache. Since cache objects only understand a memory object, there are specific methods to set/get data. The cache store consumer needs to provide store with the call back to execute when objects get removed from the cache. The memory manager provides the interface to feed memory pressure notifications to large memory consumers such as full text search.

Figure 6:
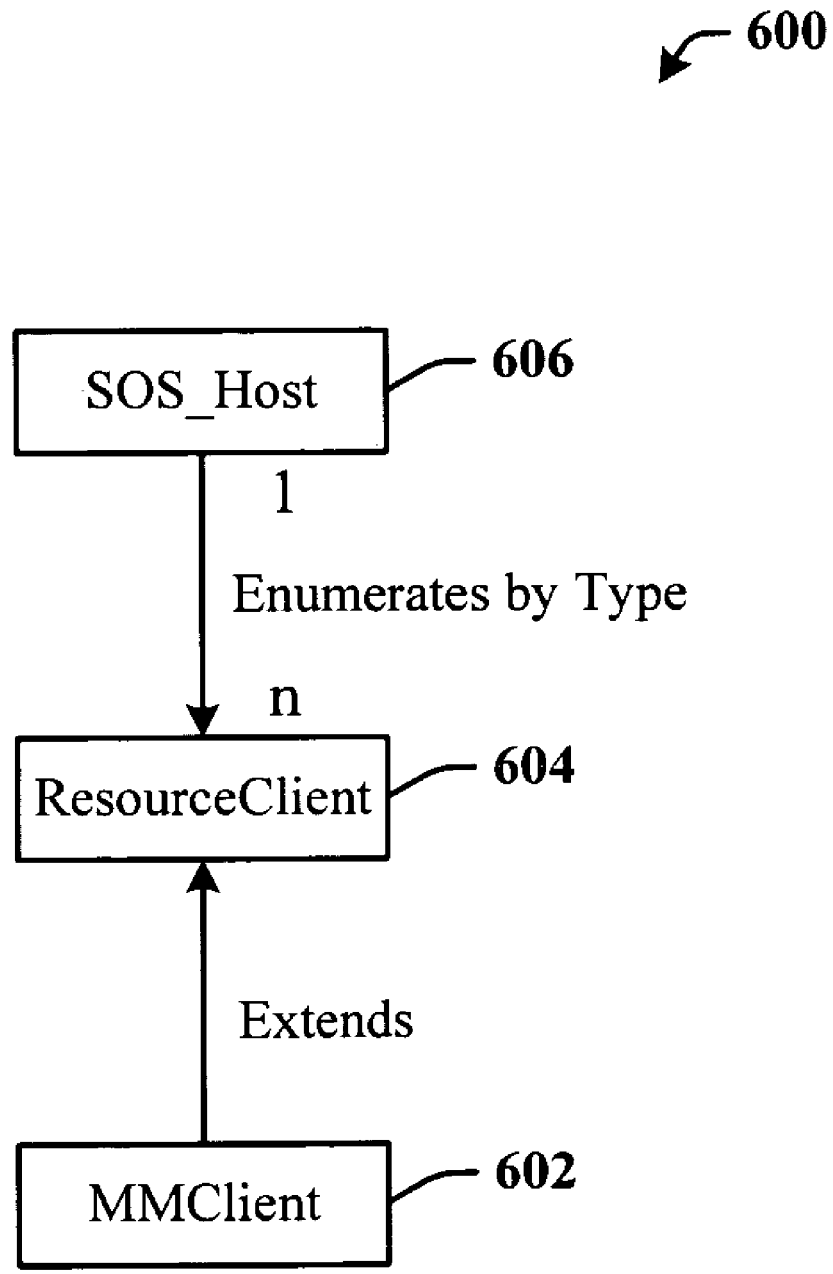
FIG. 6 illustrates an object diagram which outlines design of an MMClient interface.

FIG. 6 depicts an object diagram 600 which outlines design of a memory manager client (denoted MMClient) interface. A memory manager client 602 leverages a ResourceClient mechanism 604. The ResourceClient 604 is registered with an SOS_Host object 606 and receives notification per each resource for which it is registered. The SOS_Host object implements resource ownership. The ResourceClient interface should be implemented by clients that consume resources. MMClient 602 generalizes the ResourceClient interface 604 for the large memory consumers. Consumers such as full text, network libraries, and CLR can use the MMClient interface 602. The MMClient 602 extents the ResourceClient interface 604 for large memory consumers. The MMClient 602 exposes APIs such as Alloc/Free, VirtualAlloc/VirtualFree, and Map/Unmap for shared memory. Consumers that are interested in caching data can leverage the CacheStore interface to cache their data. Internally, CacheStore generalizes the MMClient interface 602.

Figure 7:
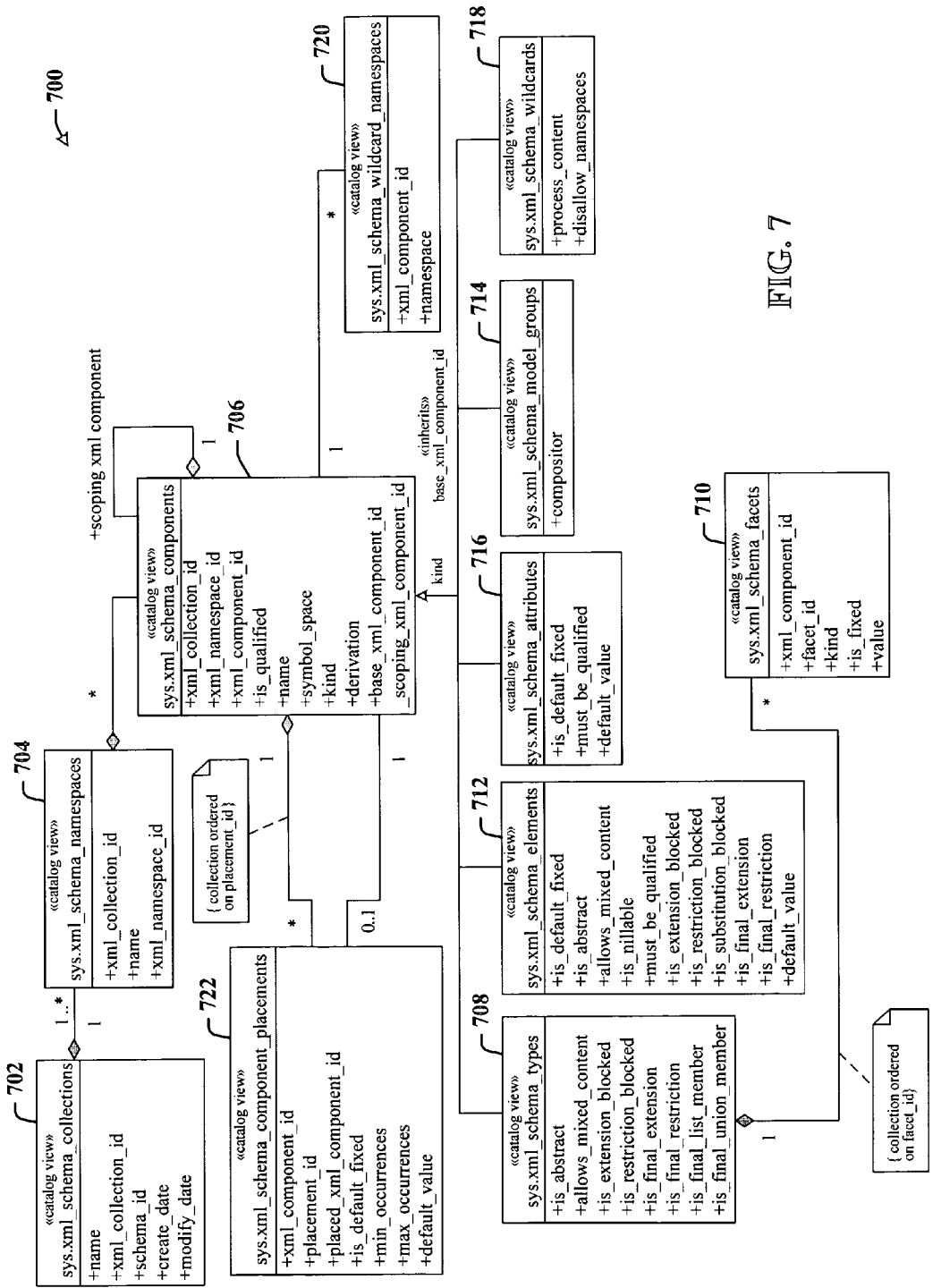
FIG. 7 illustrates a UML diagram that represents Cache Framework Design of cache storage.

FIG. 7 illustrates a UML (Unified Modeling Language) diagram 700 that represents a catalog view of a cache framework design of cache storage in accordance with an instance. Catalog views provide a tabular representation of SQL Server's internal metadata structures. Users can query the catalog views in read-only mode. Several catalog views are described herein for XML schema collections and XML schemas. The following sections describe the catalog views with an example of a "book" schema loaded into the XML schema collection (myCollection) to give some details of XML schema storage.

Following is an example of creating an XML schema collection and loading the XML schema for books into it.

```
CREATE XML SCHEMA COLLECTION myCollection
AS
'<xsd:schema xmlns:xsd="http://www.w3.org/2001/XMLSchema"
    xmlns="http://www.microsoft.com/book"
    targetNamespace="http://www.microsoft.com/book">
    <xsd:element name="book" type="bookType" />
    <xsd:complexType name="bookType">
        <xsd:sequence>
            <xsd:element name="title" type="xsd:string" />
            <xsd:element name="author" type="authorName"
                maxOccurs="unbounded"/>
            <xsd:element name="price" type="xsd:decimal" />
        </xsd:sequence>
        <xsd:attribute name="subject" type="xsd:string" />
        <xsd:attribute name="releasedate" type="xsd:integer" />
        <xsd:attribute name="ISBN" type="xsd:string" />
    </xsd:complexType>
    <xsd:complexType name="authorName">
        <xsd:sequence>
            <xsd:element name="first-name" type="xsd:string" />
            <xsd:element name="last-name" type="xsd:string" />
        </xsd:sequence>
    </xsd:complexType>
</xsd:schema>'
```

Described herein is a mechanism by which XML schemas are stored and managed internally within an SQL Server metadata component. FIG. 7 illustrates a diagram of views that can be obtained of various internal instances.

A sys.xml_schema_collections catalog view 702 can include a row per XML schema collection. An XML schema collection is a named set of XSD definitions. The XML schema collection itself can be contained in a relational schema, and it is identified by a relational schema-scoped SQL name. The values xml_collection_id and (schema_id, name) are unique for this view.

| Column Name | Data Type | Description |
| --- | --- | --- |
| xml_collection_id | int | ID of the XML schema collection. Unique within the database. |
| schema_id | int | ID of the relational schema that contains this XML schema collection. |
| name | sysname | Name of the XML schema collection. |
| create_date | datetime | Date XML schema collection was created. |
| modify_date | datetime | Date XML schema collection was last ALTERED. |

Example: Rows in sys.xml_schema_collections after the XML schema collection myCollection are created.

| | | | | | |
| --- | --- | --- | --- | --- | --- |
| 1 | 4 | NULL | sys | year-07-06 06:48:28.680 | year-07-06 06:48:28.680 |
| 65537 | 1 | NULL | myCollection | year-10-07 14:47:57.940 | year-10-07 14:47:57.940 |

A sys.xml_schema_namespaces catalog view 704 contains one row per XSD-defined XML Namespace. The (collection_id, namespace_id) and (collection_id, name) values are unique within the view.

| Column Name | Data Type | Description |
| --- | --- | --- |
| xml_collection_id | int | ID of the XML schema collection that contains this namespace. |
| name | nvarchar (4000) | Name of xml-namespace. The name = ' ' (i.e., the empty string), denotes the "no target namespace" |
| xml_namespace_id | int | 1-based ordinal that uniquely identifies xml-namespace in the XML schema collection. |

Example: Rows in sys.xml_schema_namespaces after the XML schema collection myCollection are created.

| | | |
| --- | --- | --- |
| 1 | http://www.w3.org/2001/XMLSchema | 1 |
| 65537 | http://www.microsoft.com/book | 1 |

A sys.xml_schema_components catalog view 706 contains one row per component of an XML schema. The pair (collection_id, namespace_id) is a compound foreign key to the containing namespace. xml_component_id is unique. For named components, (symbol_space, name, scoping_xml_component_id, is_qualified, xml_namespace_id, xml_collection_id) is also unique.

| Column Name | Data Type | Description |
| --- | --- | --- |
| xml_component_id | int | Uniquely identifies xml-component in the database. |
| xml_collection_id | int | ID of the XML schema collection that contains this component's namespace. |
| xml_namespace_id | int | Id of xml namespace within the collection. |
| is_qualified | bit | 1 if this component has an explicit namespace qualifier.<br>0 if this is a locally scoped component. In this case, the pair (namespace_id, collection_id) will refer to the "no namespace" targetNamespace.<br>Will = 1 for wildcard components. |
| name | nvarchar(4000) | Name of component. Will be NULL if the component is unnamed. |
| symbol_space | char(1) | "Space" in which this symbol-name is unique, based on kind, one of:<br>N = None<br>T = Type<br>E = Element<br>M = Model-Group<br>A = Attribute<br>G = Attribute-Group |
| symbol_space_desc | nvarchar(60) | Description of "space" in which this symbol-name is unique, based on kind, one of:<br>NONE<br>TYPE<br>ELEMENT<br>MODEL_GROUP<br>ATTRIBUTE<br>ATTRIBUTE_GROUP |
| kind | char(1) | Kind of xml component, one of:<br>N = "Any" Type (special intrinsic component)<br>Z = "Any Simple" Type (special intrinsic component)<br>P = Primitive Type (intrinsic types)<br>S = Simple Type<br>L = List Type<br>U = Union Type<br>C = "Complex Simple" Type (derived from Simple)<br>K = Complex Type<br>E = Element<br>M = Model-Group<br>W = Element-Wildcard<br>A = Attribute<br>G = Attribute-Group<br>V = Attribute-Wildcard |
| kind_desc | nvarchar(60) | Kind of xml component, one of:<br>ANY_TYPE<br>ANY_SIMPLE_TYPE<br>PRIMITIVE_TYPE<br>SIMPLE_TYPE<br>LIST_TYPE<br>UNION_TYPE<br>COMPLEX_SIMPLE_TYPE<br>COMPLEX_TYPE<br>ELEMENT<br>MODEL_GROUP<br>ELEMENT_WILDCARD<br>ATTRIBUTE<br>ATTRIBUTE_GROUP<br>ATTRIBUTE_WILDCARD |
| derivation | char(1) | Derivation method for derived types, one of:<br>N = None (not derived)<br>X = Extension<br>R = Restriction<br>S = Substitution |
| derivation_desc | nvarchar(60) | Description of derivation method for derived types, one of:<br>NONE<br>EXTENSION<br>RESTRICTION<br>SUBSTITUTION |
| base_xml_component_id | int | Id of component from which this is derived. NULL if none. |
| scoping_xml_component_id | int | Id of scoping component. NULL if none (global scope). |

A sys.xml_schema_types catalog view 708 contains one row per xml-component that is a Type (symbol_space of T).

| Column Name | Data Type | Description |
| --- | --- | --- |
| <inherited columns> | — | <Inherits from sys.xml_schema_components> |
| is_abstract | bit | If 1, the type is an abstract type (i.e. the abstract attribute on the complexType definition is true). All instances of an element of this type must use xsi:type to indicate a derived type that is not abstract. Default is 0 (i.e. type is not abstract). |
| allows_mixed_content | bit | If 1, mixed content is allowed (i.e. mixed attribute on the complexType definition is true). Default is 0 (mixed content is not allowed) |
| is_extension_blocked | bit | If 1, replacement with an extension of the type is blocked in instances when the block attribute on the complexType definition or the blockDefault attribute of the ancestor <schema> element information item is set to "extension" or "#all" Default is 0 (i.e. replacement with extension not blocked) |
| is_restriction_blocked | bit | If 1, replacement with a restriction of the type is blocked in instances when the block attribute on the complexType definition or the blockDefault attribute of the ancestor <schema> element information item is set to "restriction" or "#all" Default is 0 (i.e. replacement with restriction not blocked) |
| is_final_extension | bit | If 1, derivation by extension of the type is blocked when the final attribute on the complexType definition or the finalDefault attribute of the ancestor <schema> element information item is set to "extension" or "#all" Default is 0 (i.e. extension is allowed) |
| is_final_restriction | bit | If 1, derivation by restriction of the type is blocked when the final attribute on the simple or complex type definition or the finalDefault attribute of the ancestor <schema> element information item is set to "restriction" or "#all" Default is 0 (i.e. restriction is allowed) |
| is_final_list_member | bit | If 1, this simple type cannot be used as the item type in a list. Default is 0 (i.e. this type is a complex type or it can be used as list item type) |
| is_final_union_member | bit | If 1, this simple type cannot be used as the member type of a union type. Default is 0 (i.e. this type is a complex type or it can be used as union member type) |

A sys.xml_schema_facets catalog view 710 contains one row per facet (restriction) of an xml-type definition (corresponds to sys.xml_schema_types).

| Column Name | Data Type | Description |
| --- | --- | --- |
| xml_component_id | int | Id of xml-component (type) to which this facet belongs. |
| facet_id | int | Id (1-based ordinal) of facet, unique within component-id. |
| kind | char(2) | Kind of facet, one of: LG = Length LN = Minimum Length LX = Maximum Length PT = Pattern (regular expression) EU = Enumeration IN = Minimum Inclusive value IX = Maximum Inclusive value EN = Minimum Exclusive value EX = Maximum Exclusive value DT = Total Digits DF = Fraction Digits WS = White Space normalization |
| kind_desc | nvarchar (60) | Description of kind of facet, one of: LENGTH MINIMUM_LENGTH MAXIMUM_LENGTH PATTERN ENUMERATION MINIMUM_INCLUSIVE_VALUE MAXIMUM_INCLUSIVE_VALUE MINIMUM_EXCLUSIVE_VALUE MAXIMUM_EXCLUSIVE_VALUE TOTAL_DIGITS FRACTION_DIGITS WHITESPACE_NORMALIZATION |
| is_fixed | bit | If 1, the facet has a fixed, pre-specified value, Default is 0 (i.e. no fixed value) |
| value | nvarchar (4000) | The fixed, pre-specified value of the facet. |

Example: Rows in sys.xml_schema_facets after the XML schema collection myCollection are created.

| | | | | | |
|---|---|---|---|---|---|
| 15 | 1 | WS | WHITESPACE_NORMALIZATION | 0 | preserve |
| 16 | 1 | WS | WHITESPACE_NORMALIZATION | 1 | collapse |
| 17 | 1 | WS | WHITESPACE_NORMALIZATION | 1 | collapse |
| 18 | 1 | WS | WHITESPACE_NORMALIZATION | 1 | collapse |
| 19 | 1 | WS | WHITESPACE_NORMALIZATION | 1 | collapse |
| 20 | 1 | WS | WHITESPACE_NORMALIZATION | 1 | collapse |
| 21 | 1 | WS | WHITESPACE_NORMALIZATION | 1 | collapse |
| 22 | 1 | WS | WHITESPACE_NORMALIZATION | 1 | collapse |
| 23 | 1 | WS | WHITESPACE_NORMALIZATION | 1 | collapse |
| 24 | 1 | WS | WHITESPACE_NORMALIZATION | 1 | collapse |
| 25 | 1 | WS | WHITESPACE_NORMALIZATION | 1 | collapse |
| 26 | 1 | WS | WHITESPACE_NORMALIZATION | 1 | collapse |
| 27 | 1 | WS | WHITESPACE_NORMALIZATION | 1 | collapse |
| 28 | 1 | WS | WHITESPACE_NORMALIZATION | 1 | collapse |
| 29 | 1 | WS | WHITESPACE_NORMALIZATION | 1 | collapse |
| 30 | 1 | WS | WHITESPACE_NORMALIZATION | 1 | collapse |
| 31 | 1 | WS | WHITESPACE_NORMALIZATION | 1 | collapse |
| 32 | 1 | WS | WHITESPACE_NORMALIZATION | 1 | collapse |
| 33 | 1 | WS | WHITESPACE_NORMALIZATION | 1 | collapse |
| 100 | 1 | WS | WHITESPACE_NORMALIZATION | 0 | replace |
| 101 | 1 | WS | WHITESPACE_NORMALIZATION | 0 | collapse |
| 102 | 1 | PT | PATTERN | 0 | ([a-zA-Z]{2}\|[iI]-[a-zA-Z]+ \|[xX]-[a-zA-Z]{1, 8}) (-[a-zA-Z]{1, 8})* |
| 103 | 1 | PT | PATTERN | 0 | \i\c* |
| 104 | 1 | PT | PATTERN | 0 | [\i-[:]][\c-[:]]* |
| 108 | 1 | PT | PATTERN | 0 | \c+ |
| 109 | 1 | DF | FRACTION_DIGITS | 1 | 0 |
| 110 | 1 | IX | MAXIMUM_INCLUSIVE_VALUE | 0 | 0 |
| 111 | 1 | IX | MAXIMUM_INCLUSIVE_VALUE | 0 | -1 |
| 112 | 1 | IN | MINIMUM_INCLUSIVE_VALUE | 0 | -9223372036854775808 |
| 112 | 2 | IX | MAXIMUM_INCLUSIVE_VALUE | 0 | 9223372036854775807 |
| 113 | 1 | IN | MINIMUM_INCLUSIVE_VALUE | 0 | -2147483648 |
| 113 | 2 | IX | MAXIMUM_INCLUSIVE_VALUE | 0 | 2147483647 |
| 114 | 1 | IN | MINIMUM_INCLUSIVE_VALUE | 0 | -32768 |
| 114 | 2 | IX | MAXIMUM_INCLUSIVE_VALUE | 0 | 32767 |
| 115 | 1 | IN | MINIMUM_INCLUSIVE_VALUE | 0 | -128 |
| 115 | 2 | IX | MAXIMUM_INCLUSIVE_VALUE | 0 | 127 |
| 116 | 1 | IN | MINIMUM_INCLUSIVE_VALUE | 0 | 0 |
| 117 | 1 | IX | MAXIMUM_INCLUSIVE_VALUE | 0 | 18446744073709551615 |
| 118 | 1 | IX | MAXIMUM_INCLUSIVE_VALUE | 0 | 4294967295 |
| 119 | 1 | IX | MAXIMUM_INCLUSIVE_VALUE | 0 | 65535 |
| 120 | 1 | IX | MAXIMUM_INCLUSIVE_VALUE | 0 | 255 |
| 121 | 1 | IN | MINIMUM_INCLUSIVE_VALUE | 0 | 1 |
| 200 | 1 | LN | MINIMUM_LENGTH | 0 | 1 |
| 201 | 1 | LN | MINIMUM_LENGTH | 0 | 1 |
| 202 | 1 | LN | MINIMUM_LENGTH | 0 | 1 |

A sys.xml_schema_elements catalog view 712 contains one row per xml-component that is an element (symbol-_space of E).

| Column Name | Data Type | Description |
|---|---|---|
| <inherited columns> | — | <Inherits from sys.xml_schema_components> |
| is_default_fixed | bit | If 1, the default value is a fixed value (i.e. this value cannot be overridden in XML instance). Default is 0 (i.e. default value is not a fixed value for the element) |
| is_abstract | bit | If 1, the element is "abstract" and cannot be used in an instance document. A member of the element's substitution group must appear in the instance document. Default is 0 (i.e. element is not abstract). |
| is_nillable | bit | If 1, the element is nillable. Default is 0 (i.e. element is not nillable). |
| must_be_qualified | bit | If 1, the element must be explicitly namespace qualified. Default is 0 (i.e. element may be implicitly namespace qualified) |
| is_extension_blocked | bit | If 1, replacement with an instance of an extension type is blocked. Default is 0 (i.e. replacement with extension type is allowed) |

-continued

| Column Name | Data Type | Description |
| --- | --- | --- |
| is_restriction_blocked | bit | If 1, replacement with an instance of a restriction type is blocked.<br>Default is 0 (i.e. replacement with restriction type is allowed) |
| is_substitution_blocked | bit | If 1, instance of a substitution group cannot be used.<br>Default is 0 (i.e. replacement with substitution group is permitted) |
| is_final_extension | bit | If 1, replacement with an instance of an extension type is disallowed.<br>Default is 0 (i.e. replacement in an instance of an extension type is allowed). |
| is_final_restriction | bit | If 1, replacement with an instance of a restriction type is disallowed.<br>Default is 0 (i.e. replacement in an instance of a restriction type is allowed). |
| default_value | nvarchar (4000) | Default value of the element or NULL if a default value is not supplied. |

A sys.xml_schema_model_goups catalog view 714 contains one row per xml-component that is a Model-Group (symbol_space of M).

| Column Name | Data Type | Description |
| --- | --- | --- |
| <inherited columns> | — | <Inherits from sys.xml_schema_components> |
| compositor | char(1) | Compositor kind of group, one of:<br>A = XSD <all> Group<br>C = XSD <choice> Group<br>S = XSD <sequence> Group |
| compositor_desc | nvarchar (60) | Description of compositor kind of group, one of:<br>XSD_ALL_GROUP<br>XSD_CHOICE_GROUP<br>XSD_SEQUENCE_GROUP |

A sys.xml_schema_attributes catalog view 716 contains one row per xml-component that is an Attribute (symbol_space of A).

| Column Name | Data Type | Description |
| --- | --- | --- |
| <inherited columns> | — | <Inherits from sys.xml_schema_components> |
| is_default_fixed | bit | If 1, the default value is a fixed value (i.e. this value cannot be overridden in XML instance).<br>Default is 0 (i.e. default value is not a fixed value for the attribute) |
| must_be_qualified | bit | If 1, the attribute must be explicitly namespace qualified.<br>Default is 0 (i.e. attribute may be implicitly namespace qualified) |
| default_value | nvarchar (4000) | Default value of the attribute or NULL if a default value is not supplied. |

A sys.xml_schema_wildcards catalog view 718 contains one row per xml-component that is an Attribute-Wildcard (kind of V) or Element-Wildcard (kind of W), both with symbol_space of N.

| Column Name | Data Type | Description |
| --- | --- | --- |
| <inherited columns> | — | <Inherits from sys.xml_schema_components> |
| process_content | char(1) | How contents are processed, one of:<br>S = Strict validation (must validate)<br>L = Lax validation (validate if able)<br>P = Skip validation |
| process_content_desc | nvarchar (60) | Description of how contents are processed, one of:<br>STRICT_VALIDATION<br>LAX_VALIDATION<br>SKIP_VALIDATION |
| disallow_namespaces | bit | If 0 then namespaces enumerated in sys.xml_schema_wildcard_namespaces are the only ones allowed, else if 1 they are the only ones disallowed. |

Example: Rows in sys.xml_schema_wildcards after the XML schema collection myCollection are created. Since the "books" XML schema does not have a wildcard, no entries for wildcards are created.

A sys.xml_schema_wildcard_namespaces catalog view 720 contains one row per enumerated namespace for an xml-wildcard.

| Column Name | Data Type | Description |
| --- | --- | --- |
| xml_component_id | int | Id of xml-component (wildcard) to which this applies. |
| namespace | sysname | Name/URI of the namespace used by the XML wildcard. |

Example: Rows in sys.xml_schema_wildcard_namespaces after the XML schema collection myCollection are created. Since the "books" XML schema does not have a wildcard, no entries for the namespace of wildcards are created.

A sys.xml_schema_component_placements catalog view 722 contains one row per placement for xml-components.

| Column Name | Data Type | Description |
| --- | --- | --- |
| xml_component_id | int | Id of xml-component that owns this placement. |
| placement_id | int | Id of placement, unique within owning xml-component. |
| placed_xml_component_id | int | Id of placed xml-component. |
| is_default_fixed | bit | If 1, the default value is a fixed value (i.e. this value cannot be overridden in XML instance). Default is 0 (i.e. default value is not a fixed value) |
| min_occurences | int | Minimum number placed component occurs. |
| max_occurences | int | Minimum number placed component occurs. |
| default_value | nvarchar (4000) | Default value if one is supplied or NULL a default value is not supplied. |

Example: Rows in sys.xml_schema_component_placements after the XML schema collection myCollection are created.

| | | | | | | |
| --- | --- | --- | --- | --- | --- | --- |
| 65556 | 1 | 65557 | 0 | 1 | 1 | NULL |
| 65557 | 1 | 65558 | 0 | 1 | 1 | NULL |
| 65557 | 2 | 65566 | 0 | 0 | 1 | NULL |
| 65557 | 3 | 65567 | 0 | 0 | 1 | NULL |
| 65557 | 4 | 65568 | 0 | 0 | 1 | NULL |
| 65558 | 1 | 65559 | 0 | 1 | 1 | NULL |
| 65558 | 2 | 65560 | 0 | 1 | 2.147E+09 | NULL |
| 65558 | 3 | 65565 | 0 | 1 | 1 | NULL |
| 65559 | 1 | 15 | 0 | 1 | 1 | NULL |
| 65560 | 1 | 65561 | 0 | 1 | 1 | NULL |
| 65561 | 1 | 65562 | 0 | 1 | 1 | NULL |
| 65562 | 1 | 65563 | 0 | 1 | 1 | NULL |
| 65562 | 2 | 65564 | 0 | 1 | 1 | NULL |
| 65563 | 1 | 15 | 0 | 1 | 1 | NULL |
| 65564 | 1 | 15 | 0 | 1 | 1 | NULL |
| 65565 | 1 | 19 | 0 | 1 | 1 | NULL |
| 65566 | 1 | 15 | 0 | 1 | 1 | NULL |
| 65567 | 1 | 109 | 0 | 1 | 1 | NULL |
| 65568 | 1 | 15 | 0 | 1 | 1 | NULL |

There can be one sweeper per SOS node. A client cannot insert MemObject into the CacheStore that does not belong to the CacheStore. MemObject can have a reference to the outside objects, and the references should be destroyed when removal call back is called. It is the responsibility of the client to destroy objects at do not belong to the cached memory object.

Figure 8:
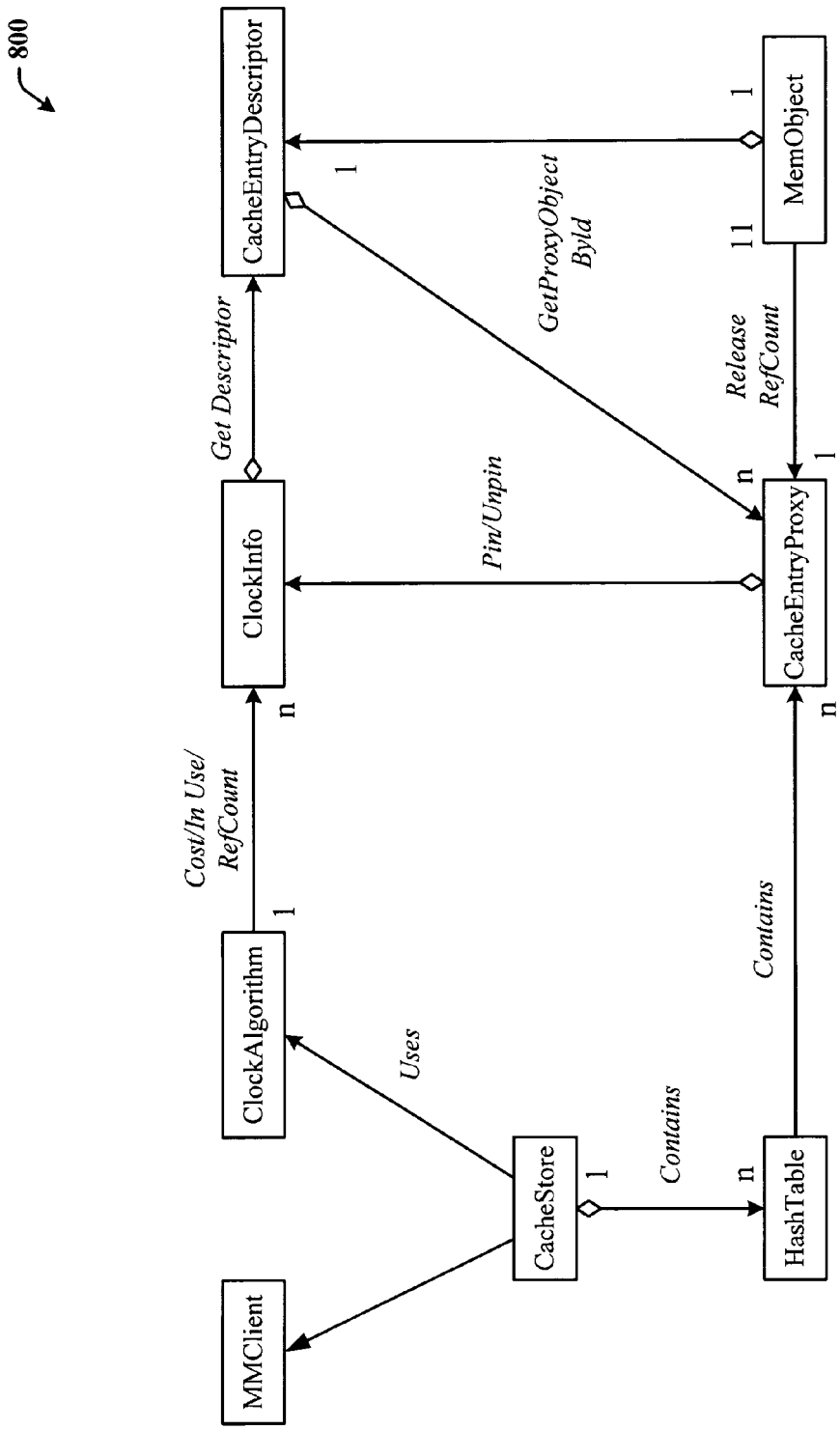
FIG. 8 illustrates a block diagram of a computer operable to execute the disclosed architecture.

FIG. 8 illustrates a more detailed diagram of a CacheStore 800 of the invention. As indicated supra, the SOS provides a generic interface, MMClient, for large memory consumers to be notified about resource availability. CacheStore leverages this mechanism to be notified about memory pressure. Since many different resources could run a clock algorithm, the design moves the implementation into a different class ClockAlgorithm. ClockAlgorithm runs on ClockInfo that encapsulates cost and in-use information. In addition, ClockInfo contains a pointer to the object it manages, which in our case is the CacheEntryDescriptor. When new objects gets inserted into the cache, CacheStore creates CacheEntryProxies and ClockInfo. It binds these and MemObject together through CacheEntryDescriptor. There is some optimization made here. Since CacheEntryProxy is only interested in the information stored in ClockInfo, it stores a direct pointer to ClockInfo. The other objects such as MemObject and ClockInfo store a pointer to CacheEntryDescriptor.

To retrieve client object from the CacheStore, the client supplies a hash value and id of the hash table. When CacheStore locates an object it checks if the CacheEntryProxy is in use, i.e., refcount>0. If it is not, it tries to pin the object using ClockInfo. If it succeeds, it addrefs proxy and returns user data stored in CacheEntryDescriptor. A pin in ClockInfo could fail in the case when object is marked for deletion.

When the client object releases UserData, CacheStore locates CacheEntryProxy using a mapping of UserData to MemObject to CacheEntryDescriptor. Then CacheStore releases CacheEntryProxy refcount. If the refcount goes to 0, it also calls into ClockInfo to unpin the object. Once the object is fully unpinned from all CacheEntryProxies, it will be considered by ClockAlgorithm for removal. ClockAlgorithm gets invoked by the sweeper when the system is low on either virtual or physical memory. When ClockAlgorithm finishes, it returns a list of the CacheEntryDescriptors that need to be removed from the CacheStore. At this point, all CacheEntryProxies indirectly marked, will be deleted and will not be considered for usage by clients. CacheStore using appropriate locking semantics, removes them.

| Object | Description |
| --- | --- |
| CacheEntryDescriptor | Object binds Memory Object, Proxies and Clock information together. |
| CacheEntryProxy | A proxy object is indirection from hash table entry to the real object. Since the same object might be in multiple hash tables at the same time, such indirection is provided. |
| CacheStore | Object implements cache interface and storage for objects to be cached. CacheStore is just another ResourceClient that implement clock algorithm. |
| ClockAlgorithm | Object implements clock algorithm to be run in the case of the memory pressure notification. |
| ClockInfo | Template object implements interface required to run clock algorithm. It contains cost, in use counter and some statistic information. Since the clock algorithm is run on Memory Objects, ClockInfo aggregates Memory Object. |
| HashTable | Storage to store the Cached Objects |
| MemObject | Memory Object used to allocate user data. |
| ResourceClient | Generic interface is used to control distribution of the different kinds of resource. |

Following is an exemplary interface design in accordance with an instance of the disclosed innovation.
Description: Create Cache Store Object SOS_CacheStore* SOS_CacheStore::CreateStore (
    Char*                  Name,
    SOS_Host*        host,
    cachestore_type  type,
    Counter          memPageSize,
    Counter          numberOfHashTables,
    hashTableDescriptor*  descriptorArray,
    DestroyCallBackRoutine  destroyRoutine,
    ControlFlags     controlFlags)

Parameters:
name—input parameter, indicates name of the cache, the name will be copied internally. If name exceeds RESOURCE_NAME_LENGTH it will be truncated.

type—input parameter that indicates the type of cache store, i.e., HTTP cache.

memPageSize—input parameter which indicates size of a page for a memory object. If page size is less than 8K, support for memory objects with page sizes less than 8K will be enabled. The page size should be power of 2.

numberOfHashTables—input parameter that indicates a number of hash tables that will be used.

mainHashTableId—input parameter that indicates id of the main hash table. Main hash table is a table for which lookups are expected to happen more often than for others.

descriptorArray—input parameter, indicates array of descriptor structures, describing configuration of the hash tables.

destroyRoutine—input parameter, indicates routine to call when cache objects gets removed from the cache controlFlags—input parameter indicates internal configuration of the Cache Store, currently supported only SMALL_OBJECTS.

SMALL_OBJECTS—indicates whether client wants cache objects allocated from default pmo. If this flag is specified, cache store will create an extra hash table to be able to map the allocation address to the CacheDescriptor. The client might need this functionality if the objects that need to be cached are small ones, the client cannot afford to waste a pmo per cache entry. This flag does not disable normal cache store functionality.

Description: Destroy Cache Store Object. All cache objects are marked to be deleted. They will be removed once usage counts goes to zero. Once all objects from the store are removed, store will be destroyed as well.

| void   SOS_CacheStore::DestroyStore (SOS_CacheStore * pStore) |
|---|

Parameters:
pStore—input parameter, indicates object to be destroyed.
Description: Create a new memory object to be used for the allocation of the cached data.

| MemObj* SOS_CacheStore::CreateMemoryObject ( ); |
|---|

Description: Retrieves default memory object of the cache store. This object should be used for allocation of the small objects. It is unavailable if a SMALL_OBJECT control flag has not been specified during the creation of the cache store.

| MemObj* SOS_CacheStore::GetDefaultMemoryObjectWithAddRef ( ); |
|---|

Description: Create a memory objects with page sizes less than 8 k. This method only could be used if cached store previously has been configured to support it. For more information see SOS_CacheStore::CreateStore.

| MemObj* SOS_CacheStore::CreateSmallMemoryObject ( ) |
|---|

Description: Insert new cache object in the cache. The object is considered to be in use until client calls SOS_CacheStore::Release. If client attempts to insert the same object more than once, there will be duplicates. To avoid duplicates, see CacheUserDataWithCondition( ).

| SOS_RESULT SOS_CacheStore::CacheUserData ( |
|---|
|     LPVOID*   pUserData , |
|     HashValue*  hashValues, |
|     Counter   currentHashTableId, |
| ); |

Parameters:
pUserData—input parameter, pointer to a data to be retrieved by RetrieveData, should be allocated out of pMemObj created through SOS_Cache::CreateMemoryObject, cannot be NULL.
hashValues—input parameter, indicates computed hash value to use.
currentHashTableId—input parameter, indicates id of the hash table that should take ownership of the current usage. When done with using this particular instance, call Release with the same hash table Id.

Description: Insert new cache object in the cache. The object is considered to be in use until client calls SOS_CacheStore::Release. When an object is inserted into the cache store, InsertConditionRoutine gets called for every object that is currently hashed to the same hashtable bucket as the one being inserted. If the routine returns false for each object in the bucket, then the new object gets inserted, otherwise object is not inserted and SOS_FAIL is returned.

| SOS_RESULT SOS_CacheStore::CacheUserDataWithCondition ( |
|---|
|     LPVOID*   pUserData , |
|     HashValue*  hashValues, |
|     Counter   currentHashTableId, |
| ); |

Parameters:
pUserData—input parameter, pointer to a data to be retrieved by RetrieveData, should be allocated out of pMemObj created through SOS_Cache::CreateMemoryObject, cannot be NULL.
hashValues—input parameter, indicates computed hash value to use.
currentHashTableId—input parameter, indicates id of the hash table that should take ownership of the current usage. When done with using this particular instance, call Release with the same hash table Id.

Description: Locates an object in the cache, if object is found, marks it in use and returns it to the client.

| LPVOID* SOS_CacheStore::GetUserData ( |
|---|
|     CacheStoreKey key, |
|     HashValue  hash, |
|     Counter   hashTableId); |

Parameters:
Key—input parameter, indicates a key to be located.
hashTableId—input parameter, indicates a hash table id in which to perform a lookup.
hash—input parameter, indicates computed hash value to use.

Description: Returns the cacheDescriptor of the cached object by traversing through the list of objects. See the next section, and examples as how to use this API.

| | |
|---|---|
| SOS_CacheObjectDescriptor* | SOS_CacheStoreEnum::GetNext ( ); |

Description: Release cache object back to store, and mark it as unused if there are no more users.

| | |
|---|---|
| SOS_RESULT | SOS_CacheStore::ReleaseUserData ( LPVOID pUserData, Counter hashTableId); |

Parameters:
hashTableId—input parameter, indicates a hash table to release object.
pUserData—input parameter, indicates object to be released, cannot be NULL
Description: Invalidates specific cache object, once the usage of such object goes to 0, it will be removed right way. Subsequent attempts to retrieve this object will fail unless new copy is created.

| | |
|---|---|
| SOS_RESULT | SOS_CacheStore::RemoveUserData (LPVOID pUserData); |

Parameters:
pUserData—input parameter, indicates object to be invalidated, cannot be NULL
Description: Removes all the objects in the cache by invalidating them. Once the usage of these objects drop to 0, it will be removed right away.

| | |
|---|---|
| void | SOS_CacheStore::RemoveAll ( ); |

Description: Stores user view of user data cost. Currently this API does not affect behavior of the cache.

| | | |
|---|---|---|
| void | SOS_CacheStore::SetCostForUserData | (LPVOID userData, Cost cost); |

Parameters:
userData—input parameter, indicates user data for which to store the cost.
cost—input parameter, indicates user cost of the object.
Description: Retrieves statistic objects for the cache.

| | |
|---|---|
| Statistic* | SOS_CacheStore::GetStatistic ( ) |

Description: Function prototype for compare routine.

| | |
|---|---|
| BOOL | (*CompareRoutine)(LPVOID pLeftData, LPVOID pRightData) |

Parameters:
pLeftData—input parameter indicates the left operand to compare.
pRightDat—input parameter indicates the right operand to compare.
Description: Function prototype for destroy call back routine

| | |
|---|---|
| void | (*DestroyCallbackRoutine) (LPVOID pData) |

Parameters:
pObject—input parameter, indicates object about to be destroyed.
Examples

```
void CacheStoreExample ( )
{
    SOS_CacheStore *    pCacheStore;
    MemObj*             pMemObj;
    MyObject*           pMyObject;
    Counter             numberOfHashTables = 1;
    DWORD               mainHashTableId =0;
    HashTableDescriptor hashDescriptor ( MAX_HASH_ENTREES,
                                MyCompareRoutine,
                                InsertConditionRoutine);
    //Create cache Store object
    //
    pCacheStore = SOS_CacheStore::CreateCacheStore (
                        "My CacheStore",
                        SOS_Node::GetDefaultHost ( ),
                        myType,
                        8192,
                        numberOfHashTables,
                        mainHashTableId,
                        &hashDescriptor,
                        MyDestroyCallBackRoutine,
                        SOS_CACHESTORE_READONLY);
    if (pCacheStore)
    {
        //Create & Initialize Cache Object
        //
        pMemObj = pCacheStore->CreateMemoryObject ( );
        if (pMemObj)
        {
            pMyObject = NewNoX (pMemObj) MyObject;
            if (pMyObject)
            {
                pMyObject->Init ( );
                pMemObj ->SetUserCost (pMyObject->GetCost ( ));
                result = pCacheStore->CacheUserData(
                    pMyObject,
                    MyHashValueGenerator (pMyObject),
                    mainHashTableId);
                if (result != SOS_OK)
                {
                    pCacheObject = NULL;
                    pMyObject = NULL;
                }
            // We do not need to use memory object anymore
            // Just release it
            //
            pMemObj->Release ( );
        }
        // to traverse through the list of objects
        //
        CacheDescriptor* pdes = NULL;
        SOSCacheEnum iter (CacheStore);
        // Loop through the list until NULL
        //
        While ((pDes = iter.GetNext(pDes)) != NULL)
        {
            // you can use the cacheDescriptor pDes here
        }
        if (pMyObject != NULL)
        {
            //Continue using my object . . .
            //
```

```
            ...
            //We are done with our object . . .
            //
            pCacheStore->ReleaseUserData (pCacheObject,
                                mainHashTableId);
            // Cannot access pMyObject pCacheStore any longer
            //
            pMyObject = NULL;
            pCacheObject = NULL;
        }
        //We are done with store . . .
        //
        SOS_OS::DestroyCacheStore (pCacheStore);
        pCacheStore = NULL;
    }
    return;
}
```

With respect to user store design, some memory caches would like to use custom hash tables. These caches need to have a mechanism to respond to memory pressure. For such clients SOS provides User Store.

Following is an exemplary user store interface design.

Description: Create User Store Object

| SOS_UserStore* | SOS_UserStore::CreateStore ( |  |
|---|---|---|
| | _IN_ PCWSTR | storeName, |
| | _IN_ userstore_type | type, |
| | _IN_ DestroyRoutine | destroyRoutine, |
| | _IN_ MEMOBJ_ID | memObjId); |

Parameters:

storeName—input parameter, indicates name of the store, the name will be copied internally, if name exceeds RESOURCE_NAME_LENGTH it will be truncated.

type—input parameter, indicates type of the user store, need to be declared in soshostv.h destroyRoutine—input parameter, indicates routine to call when user descriptor gets removed from the store.

Description: Destroy User Store Object. All user descriptor can be marked to be deleted. They will be removed once their usage counts goes to zero. Once all objects from the store are removed, store will be destroyed as well.

| VOID | SOS_UserStore::DestroyStore (SOS_UserStore* pStore) |
|---|---|

Parameters:

pStore—input parameter, indicates object to be destroyed.

Description: Create a new memory object to be used for the allocation of the cached data.

| MemObj* SOS_UserStore::CreateMemoryObject ( |
|---|
| /*The same as |
|     MemoryObjectFactory::CreatemMemoryObject |
| */); |

Description: Create a user descriptor. A descriptor could be destroyed by calling DestroyDescriptor.

| SOS_UserDescriptor* | SOS_UserStore::CreateDescriptor ( ) |
|---|---|

Parameters:
VOID

Description: Activate descriptor in the store. Make it visible to clock algorithm. Once descriptor is activated client has extra reference on it. To remove this reference, the client calls UnLockDescriptor. One cannot destroy an active descriptor directly. For more info see DeactivateDescriptor.

| SOS_RESULT | SOS_UserStore::ActivateDescriptor ( |
|---|---|
| | SOS_UserDescriptor* descriptor); |

Parameters:

descriptor—input parameter, pointer to descriptor being activated.

Description: Lock descriptor in the store so that it cannot be removed under memory pressure. Call UnLock if you need resource being considered for removal under memory pressure. This API could fail. Failure means that the descriptor is about to be removed from the store by clock algorithm. In this case expect the destroy method either being called or about to be called. Some synchronization is provided to ensure stability of the object.

| SOS_RESULT | SOS_UserStore::LockDescriptor ( |
|---|---|
| | SOS_UserDescriptor* descriptor); |

Parameters:

descriptor—input parameter, pointer to descriptor being locked.

Description: Unlocks previously called lock or if descriptor was just activated. Once all pairs of Lock/Unlock are matched, clock algorithm will consider descriptor for removal under memory pressure.

| SOS_RESULT | SOS_UserStore::UnLockDescriptor (SOS_UserDescriptor* descriptor); |
|---|---|

Parameters:

descriptor—input parameter, pointer to descriptor being unlocked.

Description: Mark descriptor as to be no longer considered for removal. This method is called when descriptor becomes dirty. LockDescriptor should always precede DeactivateDescriptor. DeactivateDescriptor should follow UnlockDescriptor.

| SOS_RESULT | SOS_UserStore::DeactivateDescriptor ( |
|---|---|
| | SOS_UserDescriptor* descriptor); |

Parameters:

descriptor—input parameter, pointer to descriptor being deactivated.

Description: Function prototype is called by clock algorithm to remove the descriptor.

| VOID (*DeactivateCallBack) (SOS_UserDescriptor* userDescriptor) |
|---|

Parameters:
userDescriptor—input parameter, indicates descriptor to be removed.
Description: Save user data in descriptor. Saved user data could be used in deactivate call back to clean up user data associated with descriptor.

| SOS_RESULT SOS_UserDescriptor::SetUserData (LPVOID userData); |
|---|

Parameters:
UserData—pointer to user data is associated with the descriptor.

Examples:

```
void CacheStoreExample ( )
{
  SOS_CacheStore *       pCacheStore;
    MemObj*              pMemObj;
    MyObject*            pMyObject;
    Counter              numberOfHashTables = 1;
    DWORD                mainHashTableId =0;
    HashTableDescriptor  hashDescriptor ( MAX_HASH_ENTREES,
                                          MyCompareRoutine,
                                          InsertConditionRoutine);
      //Create cache Store object
      //
      pCacheStore = SOS_CacheStore::CreateCacheStore (
                                          "My CacheStore",
                                          SOS_Node::GetDefaultHost ( ),
                                          myType,
                                          8192,
                                          numberOfHashTables,
                                          mainHashTableId,
                                          &hashDescriptor,
                                          MyDestroyCallBackRoutine,
                                          SOS_CACHESTORE_READONLY);
      if (pCacheStore)
      {
        //Create & Initialize Cache Object
        //
        pMemObj = pCacheStore->CreateMemoryObject ( );
        if (pMemObj)
        {
          pMyObject = NewNoX (pMemObj) MyObject;
          if (pMyObject)
          {
            pMyObject->Init ( );
            pMemObj ->SetUserCost (pMyObject->GetCost ( ));
            result = pCacheStore->CacheUserData(
                            pMyObject,
                            MyHashValueGenerator (pMyObject),
                            mainHashTableId);
            if (result != SOS_OK)
            {
              pCacheObject = NULL;
              pMyObject = NULL;
            }
            // We do not need to use memory object anymore
            // Just release it
            //
            pMemObj->Release ( );
          }
          // to traverse through the list of objects
          //
          CacheDescriptor* pdes = NULL;
          SOSCacheEnum iter (CacheStore);
          // Loop through the list until NULL
          //
          While ((pDes = iter.GetNext(pDes)) != NULL)
          {
            // you can use the cacheDescriptor pDes here
          }
          if (pMyObject != NULL)
          {
            //Continue using my object . . .
            //
            . . .
```

```
        //We are done with our object . . .
        //
        pCacheStore->ReleaseUserData (pCacheObject,
                                      mainHashTableId);
        // Cannot access pMyObject pCacheStore any longer
        //
        pMyObject = NULL;
        pCacheObject = NULL;
    }
    //We are done with store . . .
    //
    SOS_OS::DestroyCacheStore (pCacheStore);
    pCacheStore = NULL;
  }
  return;
}
```

An additional optimization can include memory management for a buffer pool. An MMClient interface can also be added.

The XML Schema specification is verbose and complicated. An XML schema describes the structure of an XML document. The invention finds application to a SQL server that supports the XML type system in which XML Schema documents are stored in relational tables. Other components of the SQL Server, such as an XML query processor and optimizer, use the XML type system for query compilation and execution. Furthermore, advanced applications, such as related to a repository, can be built on top of the XML type system.

Storing an XML Schema document in a relational database system presents new challenges. More specifically: the identification of the XML Schema document (e.g., using its targetnamespace); type definitions specified within an XML Schema document should be mapped to relational rows that capture the nature and the type of the definitions (e.g., an element type definition such as CustomerType in the XML Schema document - - - when stored in the relational system - - - must remember the fact that it is an element type definition); type hierarchy should be recorded; simple type facets provide additional information that should be captured; and it should also be possible to reconstruct the XML Schema type definitions from the relational structures.

The novelty of this approach is multi-fold. Firstly, searches for specific components by ID or by Name are fast. All XML Schema component searches (by name or by id) utilize index seeks of the relational store, which minimizes the number of I/O operations. Secondly, the derivation chain structure is also indexed. Therefore, determining type relationships is easy and efficient. Thirdly, because shredded schemas are regular relational objects various relational views of the XML schema components can be exposed. For example, the different XML schema components (e.g., elements, attributes, types, wildcards) can be exposed to users in one component table. Fourthly, shredding the XML schemas allows users to write any queries they desire.

Finally, because XML schemas are shredded into tables, XML instance validation loads only the necessary components to perform validation. During validation, only parts of the schema that are used are loaded and cached. The Schema Cache stores the in-memory representation of XML schema optimized for XML instance validation. XML schema components are loaded from metadata into main memory as read-only objects such that multiple users can use the in-memory objects for validation. If the XML schema is changed during the operation, the schema cache entries are invalidated. Additionally, if the database server is under heavy load, unused schema cache entries are unloaded. In view of the above novel capabilities, a scalable system is provided that can operate in large enterprise environments involving thousands of XML schema components and supporting many concurrent users.

Figure 9:
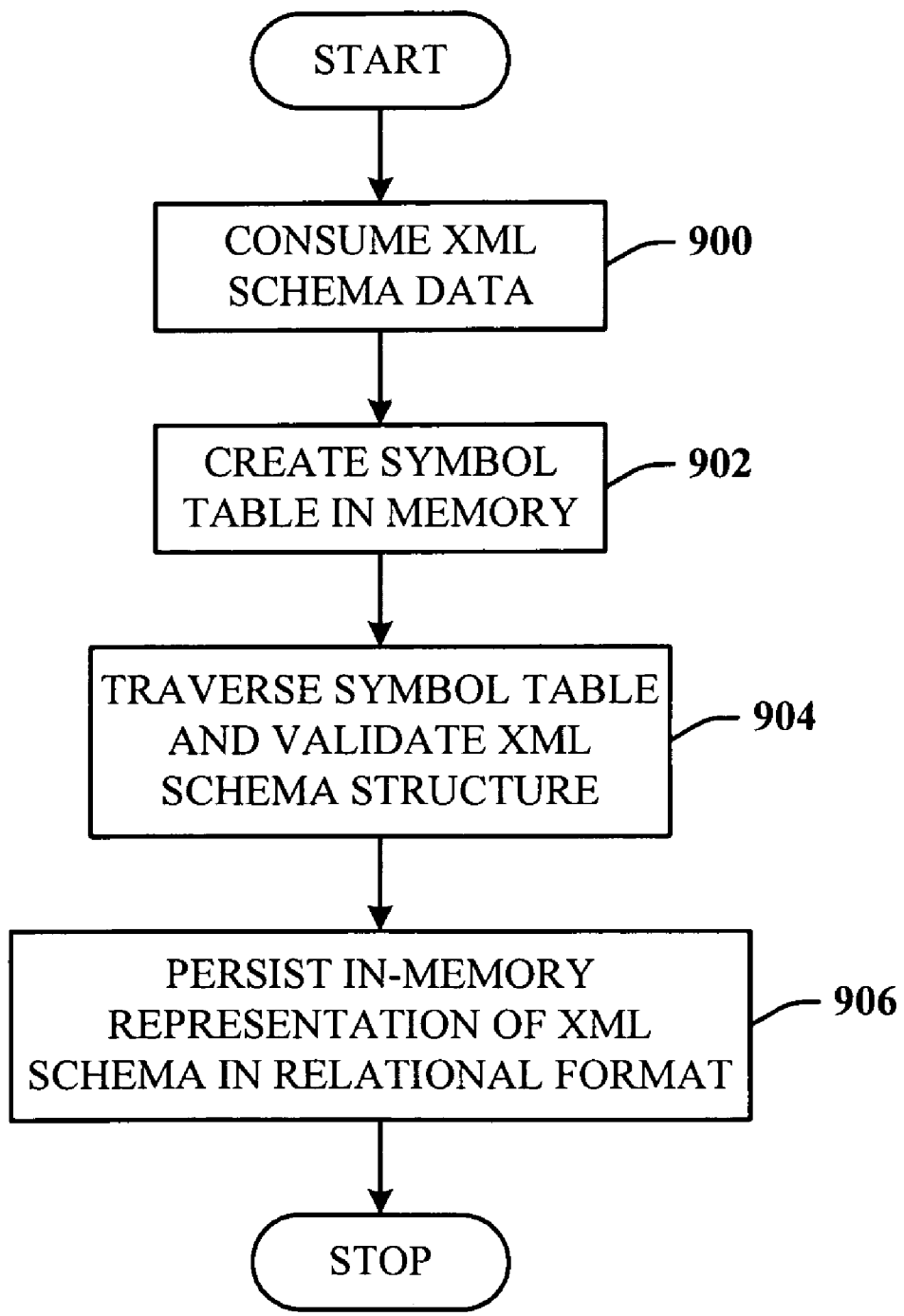
FIG. 9 illustrates a flow chart of one methodology of XML/relational translation.

Referring now to FIG. 9, there is illustrated a flow chart of one methodology for XML/relational translation. Translation from XML to a relational representation of the XML schema can consist of several phases. At 900, in a first phase, XML schema data is consumed in preparation for the translation process. At 902, a symbol table is created in memory (in-memory representation of the XML schema). In a second phase, at 904, the symbol table is traversed and the structure of the XML schema is validated. In a final phase, at 906, the in-memory representation of the XML schema is persisted in a relational format.

Figure 10:
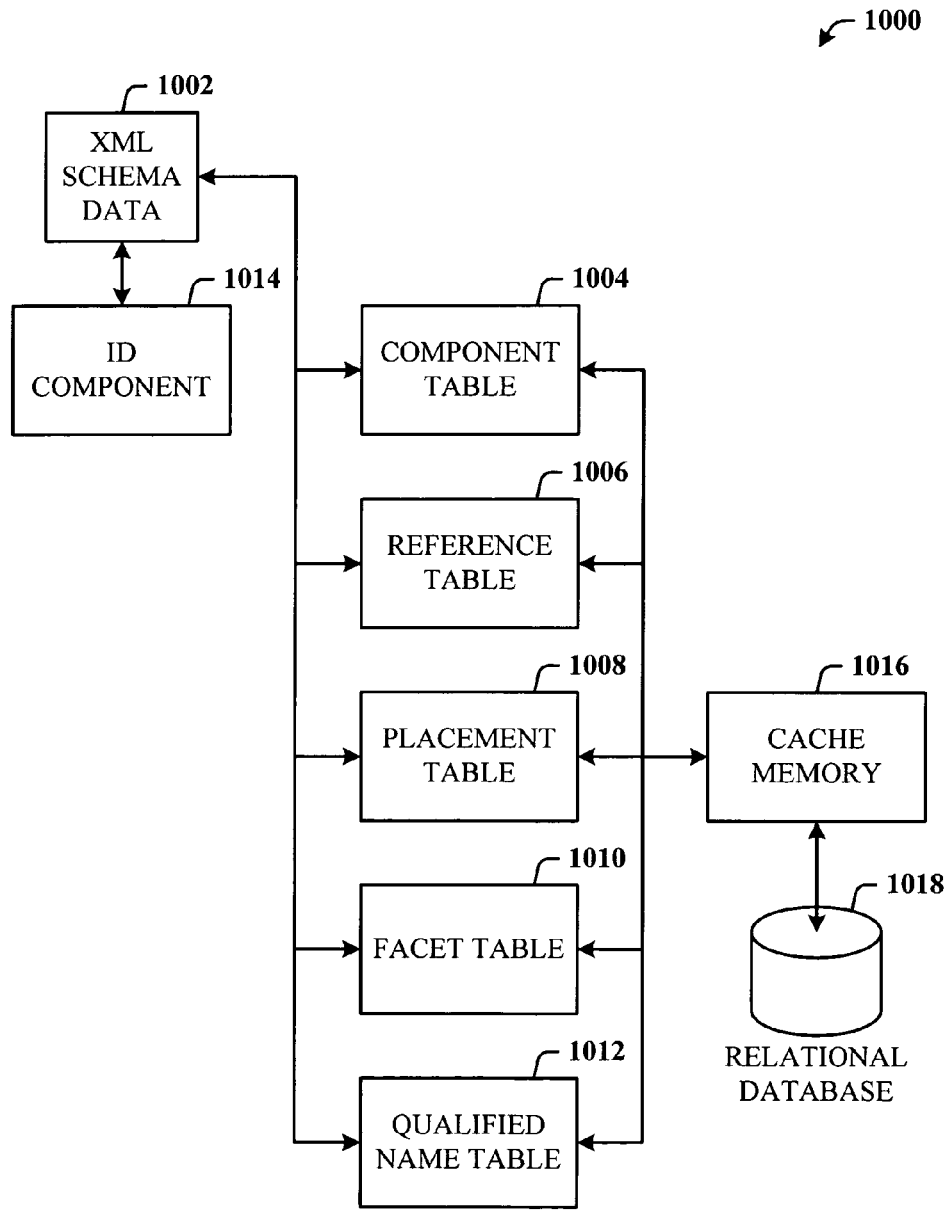
FIG. 10 illustrates a system of tables into which XML schema data can be shredded.

During the final phase of persisting data, the novel code populates metadata tables that describe the structure of the XML Schema types. FIG. 10 illustrates a system 1000 of tables into which XML schema data 1002 is shredded. In one implementation, the XML schema data 1002 is persisted as metadata in several tables: a component table 1004, a reference table 1006, a placement table 1008, a facet table 1010, and a qualified name table 1012. An ID component 1014 interfaces to the XML Schema data 1002 in order to assign an identifier (e.g., a component ID) to each component thereof. A cache memory 1016 interfaces to each of the tables (1004, 1006, 1008, 1010, and 1012) such that the contents of any single table or combination of tables can be accessed and persisted therein to provide improved data access with a relational database 1018.

Figure 11:
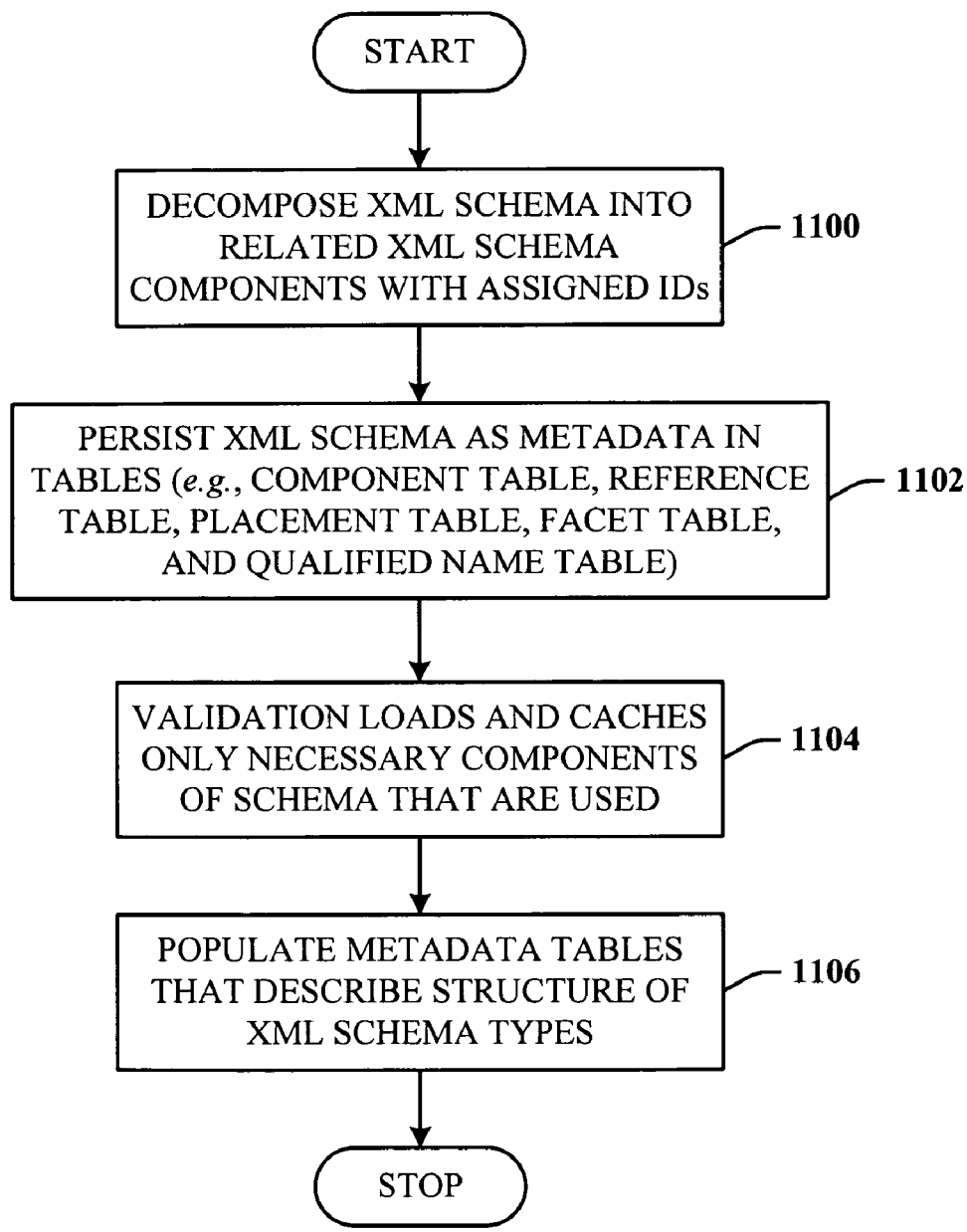
FIG. 11 illustrates a methodology of processing XML Schema data into tables.

Accordingly, FIG. 11 illustrates a methodology of processing XML Schema data into tables. At 1100, the XML Schema data is decomposed into related XML Schema components with assigned IDs. At 1102, the XML schema is persisted as metadata in the tables. At 1104, the validation process loads and caches only necessary schema components that are to be used. At 1106, the tables are populated with data that describes the structure of the XML schema types.

Figure 12:
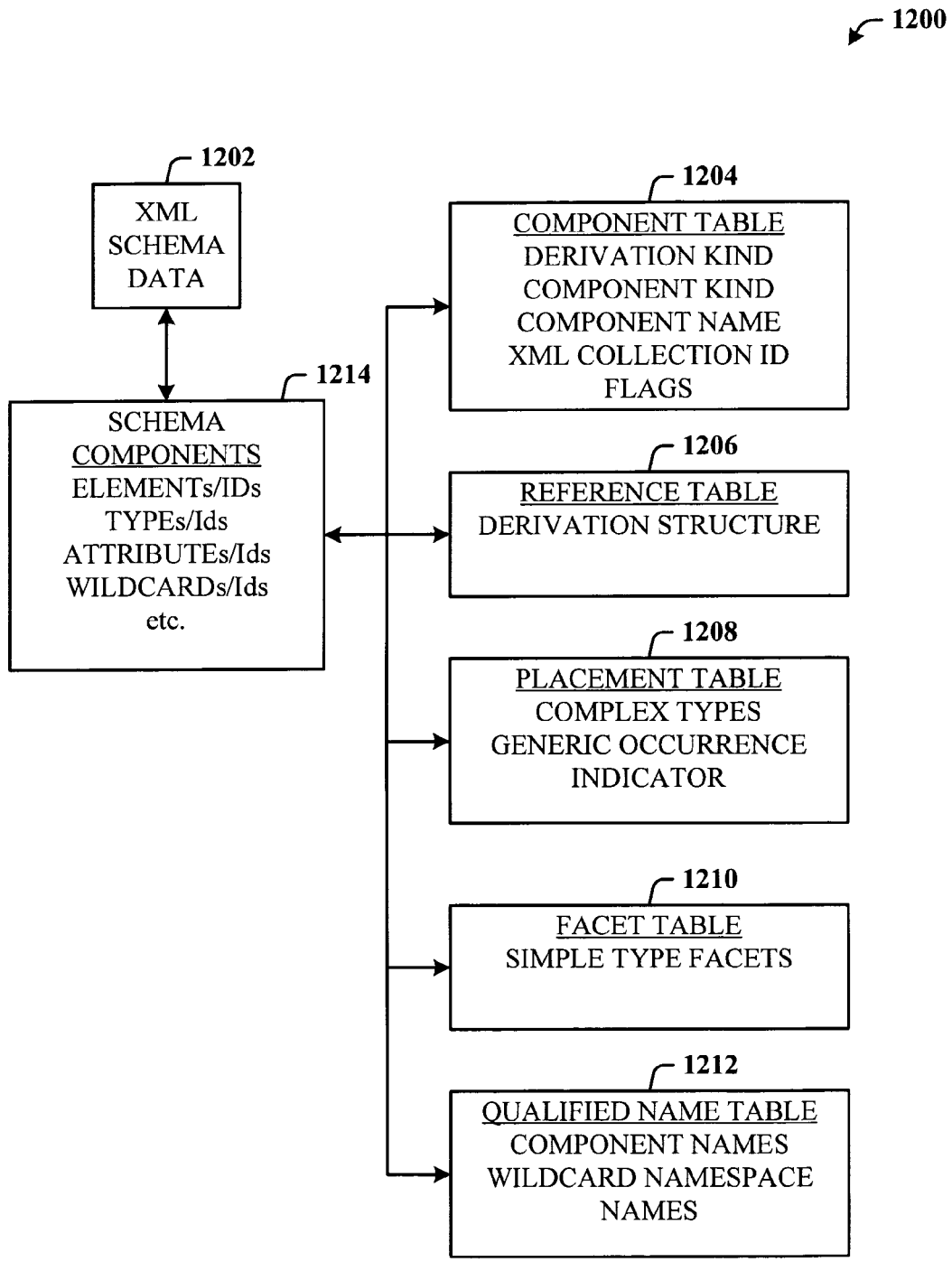
FIG. 12 illustrates a more detailed table system and the metadata that can be stored in each.

FIG. 12 shows a more detailed table system 1200 and the metadata that can be stored in each. An XML schema data 1202 includes several flavors of XML components (Elements, Types, Attributes, Wildcards, etc.) that are assigned IDs by an ID component 1214. In one implementation, each of the components is assigned an ID (denoted as ELEMENTs/IDs, TYPEs/IDs, ATTRIBUTEs/IDs, WILDCARDs/IDs, etc.). Basic properties of XML Schema components are recorded in a component table 1204, and include attributes which are derivation kind, component kind, component name, XML collection ID, and various flags. A derivation structure related to the derivation kind is recorded in the reference table 1206. Simple type facets are recorded in the facet table 1210. For complex types, the hierarchy is specified through placements of the placement table 1208. Placements also contain generic occurrence indicator. Essentially, placements can be thought of as edges between graph nodes formed by XML Schema components. All of the component names, as well as wildcard namespace names, are recorded in the qualified name table 1212.

A new concept called XML schema collection can be used for management of XML schemas in the database, and is described in a previous pending U.S. patent application Ser. No. 10/726,080 entitled "XML Schema Collections and Corresponding Systems and Methods" filed Dec. 1, 2003, by the assignee of this application. The collection is a metadata object into which one or more XML schemas may be loaded at the same time the XML schema collection is created using a statement CREATE XML SCHEMA COLLECTION.

Once the XML schema collection has been created, more XML schemas may be loaded into it by altering the XML schema collection using a statement ALTER XML SCHEMA COLLECTION. The XML schema collection can be removed from the system using the statement DROP XML SCHEMA COLLECTION.

Following is an example of adding an XML schema for DVDs to an existing XML schema collection.

```
ALTER XML SCHEMA COLLECTION myCollection
ADD
'<xsd:schema xmlns:xsd="http://www.w3.org/2001/XMLSchema"
    xmlns="http://www.microsoft.com/DVD"
    targetNamespace="http://www.microsoft.com/DVD">
    <xsd:element name="dvd" type="dvdType" />
    <xsd:complexType name="dvdType">
        <xsd:sequence>
            <xsd:element name="title" type="xsd:string" />
            <xsd:element name="price" type="xsd:decimal" />
        </xsd:sequence>
        <xsd:attribute name="subject" type="xsd:string" />
        <xsd:attribute name="releasedate" type="xsd:integer" />
    </xsd:complexType>
</xsd:schema>'
```

Figure 13:
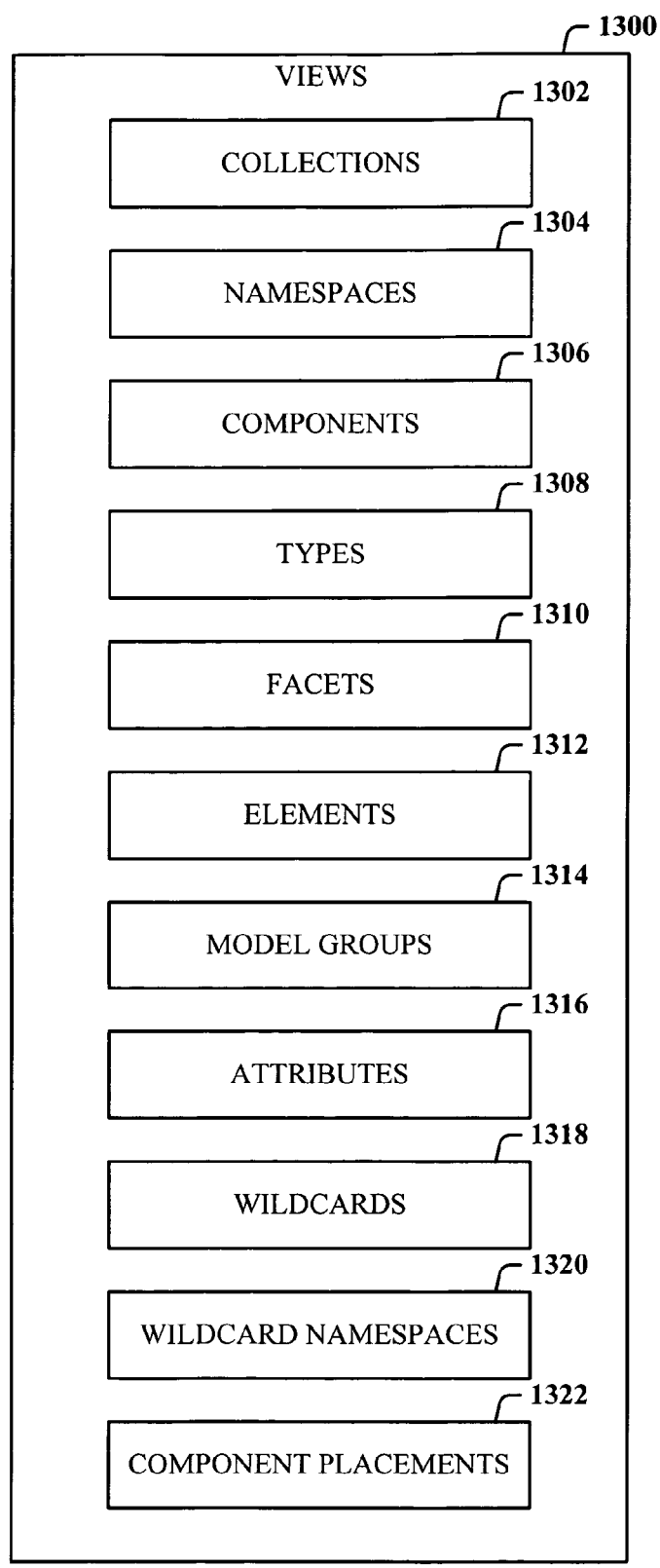
FIG. 13 illustrates a diagram of views that can be obtained of various internal aspects.

Following is an example of dropping the XML schema collection.
DROP XML SCHEMA COLLECTION myCollection FIG. 13 illustrates a diagram of views 1300 that can be obtained of various internal aspects. The views 1300 can include collections 1302, namespaces 1304, components 1306, types 1308, facets 1310, elements 1312, model groups 1314, attributes 1316, wildcards 1318, wildcard namespaces 1320, and component placement entities 1322.

Figure 14:
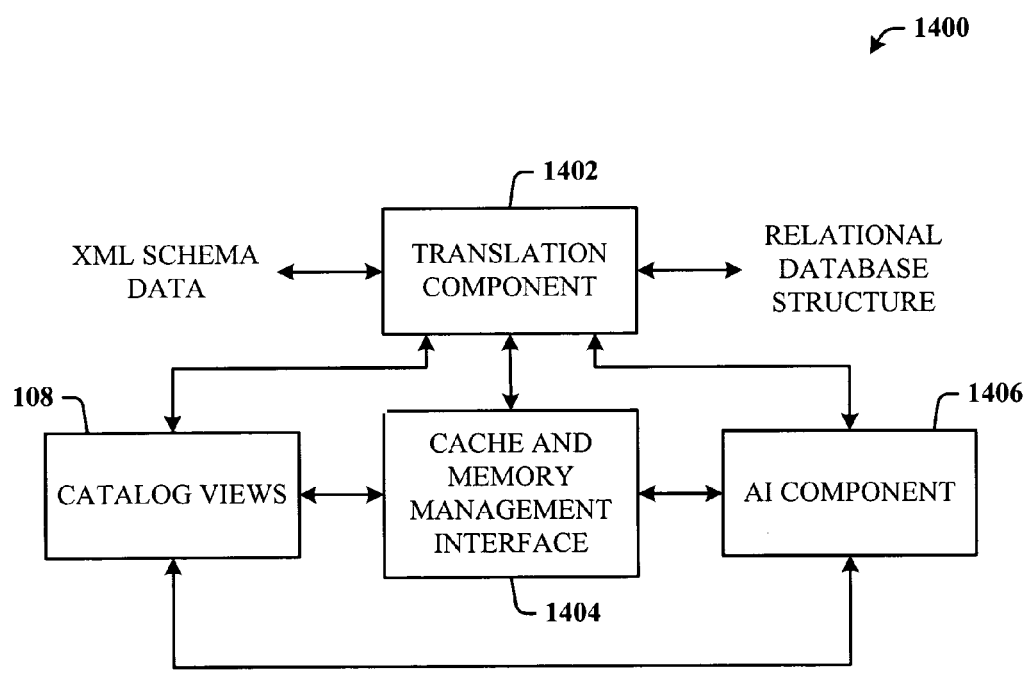
FIG. 14 illustrates a system that employs artificial intelligence to learn and automate features of caching.

FIG. 14 illustrates a system that employs an optimization in the form of artificial intelligence (AI) to learn and automate features of caching in accordance with the invention. The system 1400 employs a translation component 1402 for facilitating translation of XML schema data into a relational structure. In support thereof, a cache memory and MMI component 1404 interfaces to the translation component 1402 to provide caching of only metadata necessary for the translation. The view components 108 provide viewing capability of the internal tables and the data stored therein, in the cache, and outside of the cache. An AI component 1406 interfaces to the translation component 1402, the cache memory and MMI component 1404, and views component 108 to learn and automate various features associated therewith.

The subject invention (e.g., in connection with selection of objects to place in the cache memory) can employ various AI-based schemes for carrying out various aspects thereof. For example, a process for determining what objects to place in the cache memory and how the internal translation algorithm works on the objects in the cache can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to interacting with the view component 108 to determine when to automatically present a view of one or more of the internal tables. This can be determined according to actions of a particular user as determined by learning the user behavior and/or according to user preferences.

Additionally, the AI component 1406 interfaces to the cache memory and MMI component 1404 to facilitate optimizing cache efficiency where a plurality of users are interacting therewith such that numerous sets of XML schema data are being translated substantially simultaneously. Moreover, in such a scenario, caching becomes even more important. For example, where two or more data inputs are substantially similar, the AI component 1406 can detect such similarities and process the data before other data translation, further caching such associated metadata to optimize the translation process.

In another implementation, the AI component 1406 analyzes the type of data being input, in response to which higher priority data can be processed before other lower priority data. For example, if the XML data is financial data, and other data is related to lower priority standard data, the financial data can be cached and translated before the lower priority data. Numerous other automations can be implemented using the AI component 1406, and such automations are within contemplation of the subject invention.

Figure 15:
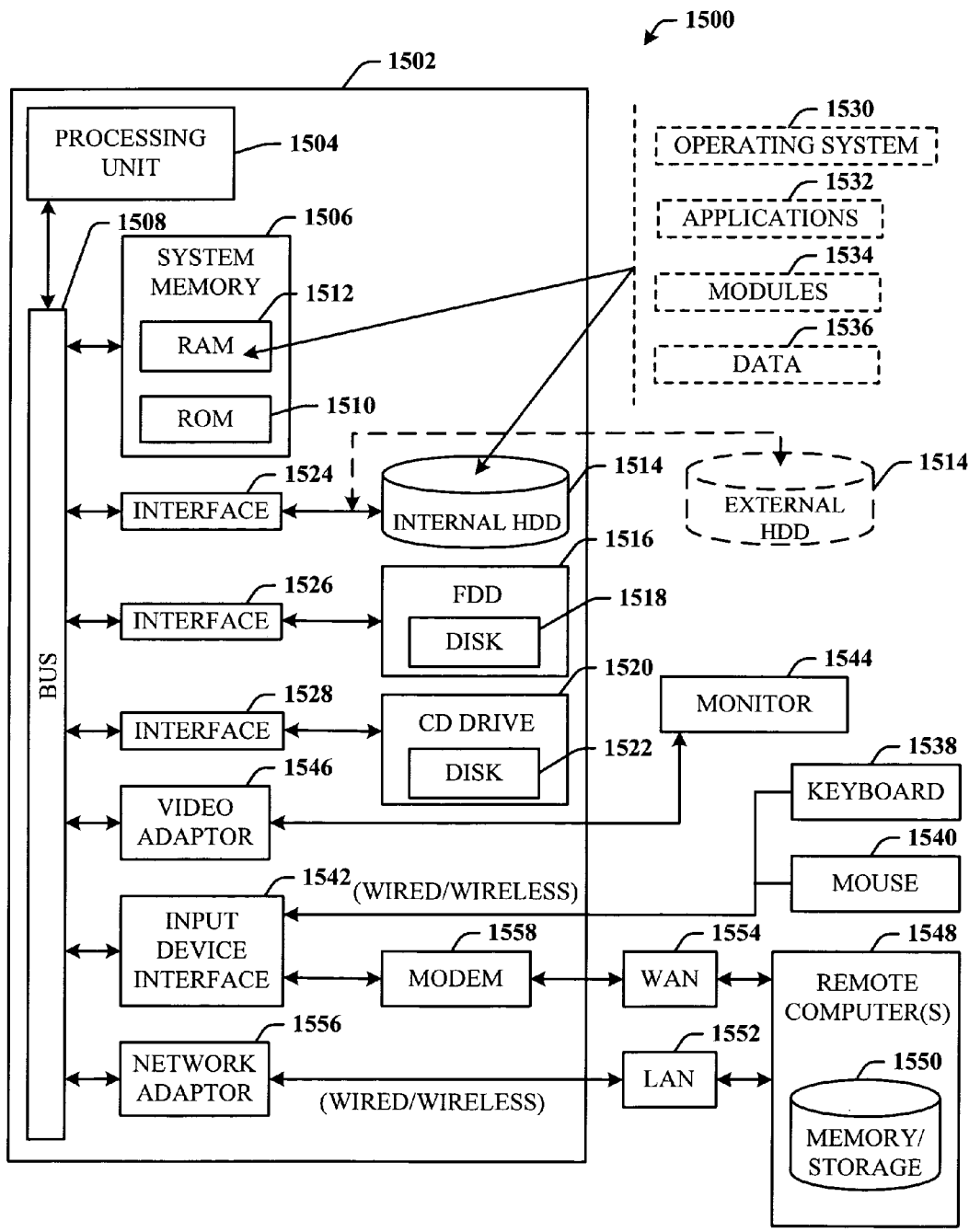
FIG. 15 illustrates a system that facilitates translation between XML schema data and relational data.

Referring now to FIG. 15, there is illustrated a block diagram of a computer operable to facilitate translation between XML schema data and relational data. In order to provide additional context for various aspects of the subject invention, FIG. 15 and the following discussion are intended to provide a brief, general description of a suitable computing environment 1500 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 15, there is illustrated an exemplary environment 1500 for implementing various aspects of the invention that includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is appreciated that the invention can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 16:
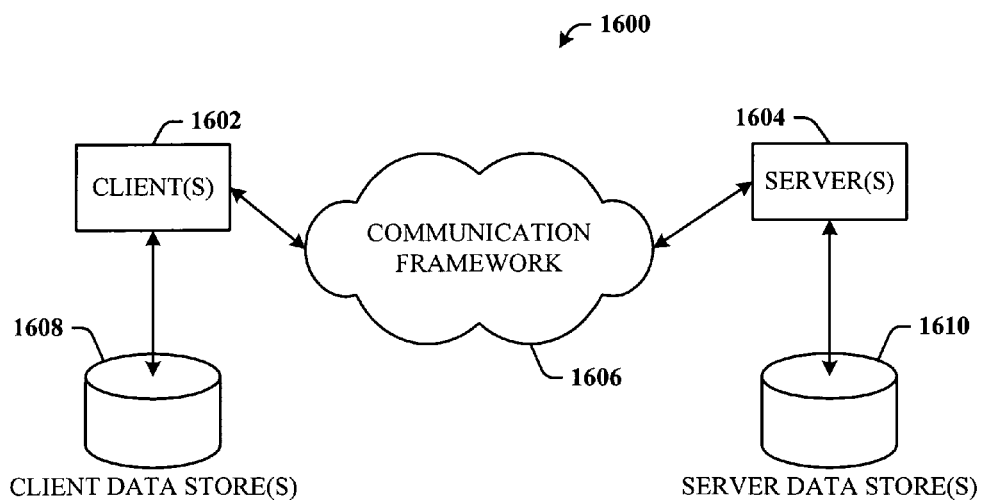
FIG. 16 illustrates a schematic block diagram of an exemplary computing environment that facilitates translation between XML schema data and relational data.

Referring now to FIG. 16, there is illustrated a schematic block diagram of an exemplary computing environment 1600 that facilitates translation between XML schema data and relational data. The system 1600 includes one or more client(s) 1602. The client(s) 1602 can be hardware and/or software (e.g., threads, processes, computing devices). The client(s) 1602 can house cookie(s) and/or associated contextual information by employing the invention, for example.

The system 1600 also includes one or more server(s) 1604. The server(s) 1604 can also be hardware and/or software (e.g., threads, processes, computing devices). The servers 1604 can house threads to perform transformations by employing the invention, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates cache management, comprising:
  a cache interface that provides a common interface for consumers that use a cache memory, the cache interface facilitates access to at least one of an HTTP (hypertext transfer protocol) cache that facilitates authentication and logon, an LPE (log predictive error) cache that facilitates caching of compiled plans for execution, a metadata cache that employs a hash table for the storage of the metadata, an XML schema cache that stores schema types, and an optimizer cache for the presentation of views of the tables;
  a caching component that caches selected schema components in the cache memory during schema translation to perform instance validation, the schema components are shredded into selected tables of metadata and only the most frequently used schema components are selectively loaded and cached;
  wherein instance validation loads only selected components of the schema components to perform the validation and during validation only the selected components that are used are loaded and cached;
  wherein the caching component utilizes a mechanism for cache cleanup that keeps the most frequently used schema components in memory while less frequently used schema components are removed periodically, the mechanism for cache cleanup is driven by memory pressure and based upon a number of Input/Output (I/O) reads to compute a cache entry and total memory required to compute the cache entry, such that if the system is overloaded, schema components will be more aggressively removed from the cache, and wherein the cache is not allowed to keep unused data permanently, and thus, the cache supports forced cleanup; and a costing mechanism that expresses costing in the same quantities for all caches and implements aging and cleanup, the costing mechanism is based on Central Processing Unit (CPU) and I/O time required to extract type information from the cache, and wherein lifetime of an entry in the cache is defined by usage and cost.

2. The system of claim 1, wherein the schema structure is XML.

3. The system of claim 1, wherein the schema cache stores an in-memory representation of an XML schema for XML instance validation.

4. The system of claim 1, further comprising a views component that facilitates viewing the internal tables of metadata in a tabular format.

5. A computer-readable medium having stored thereon computer-executable instructions for carrying out the system of claim 1.

6. The system of claim 1, further comprising an artificial intelligence component that employs a probabilistic and/or statistical-based analysis to prognose or infer an action that a user desires to be automatically performed.

7. A computer-implemented method of performing data management, comprising:
receiving data representative of a schema;
providing a common cache interface for consumers of a cache memory that facilitates dynamic control of the cache memory;
caching in the cache memory selected schema components to perform instance validation;
shredding the selected schema components into selected tables of metadata and selectively loaded and caching only the most frequently used schema components;
loading only selected components of the schema components to perform the validation and during validation loading and caching only the selected components that are used;
utilizing a mechanism for cache cleanup that keeps the most frequently used schema components in memory while less frequently used schema components are removed periodically, the mechanism for cache cleanup is driven by memory pressure and based upon a number of Input/Output (I/O) reads to compute a cache entry and total memory required to compute the cache entry, such that if the system is overloaded, schema components will be more aggressively removed from the cache, and wherein the cache is not allowed to keep unused data permanently, and thus, the cache supports forced cleanup; and
expressing cost in the same quantities for all caches and implementing aging and cleanup via a costing mechanism, the costing mechanism is based on Central Processing Unit (CPU) and I/O time required to extract type information from the cache, and wherein lifetime of an entry in the cache is defined by usage and cost.

8. The method of claim 7, further comprising an act of caching in the cache memory at least one of a type, attribute, and element of the schema components.

9. The method of claim 7, wherein dynamic control includes automatically disabling the cache memory.

10. The method of claim 7, further comprising an act of automating one or more features by employing an artificial intelligence component that employs a probabilistic and/or statistical-based analysis to prognose or infer an action that a user desires to be automatically performed.

11. The method of claim 7, further comprising an act of preventing duplicate cache entries.

12. The method of claim 7, further comprising an act of segmenting the cache memory into at least one of an HTTP cache, LPE procedure cache, metadata cache, schema cache, and optimizer cache.

13. The method of claim 7, further comprising an act of providing a common aging mechanism that ages out unused schema components from the cache memory based on different aging criteria and different aging policies.

14. The method of claim 7, further comprising an act of managing the cache memory with an internal SQL server memory management architecture.

15. A system that facilitates data management, comprising:
means for receiving data representative of a schema;
means for decomposing the schema into tables of schema components;
means for caching in a cache memory selected components of the schema components to perform instance validation;
means for shredding the selected schema components into selected tables of metadata and selectively loaded and caching only the most frequently used schema components;
means for aging out unused schema components from the cache memory;
means for performing memory cleanup based upon a number of I/O reads and total memory required to compute a cache entry; and
means for expressing cost in the same quantities for all caches and implementing aging and cleanup via a costing mechanism, the costing mechanism is based on Central Processing Unit (CPU) and I/O time required to extract type information from the cache, and wherein lifetime of an entry in the cache is defined by usage and cost.

16. The system of claim 15, further comprising means for releasing memory based upon a memory pressure notification.

* * * * *

UNITED STATES PATENT AND TRADEMARK OFFICE
CERTIFICATE OF CORRECTION

| | | |
|---|---|---|
| PATENT NO. | : 7,475,093 B2 | |
| APPLICATION NO. | : 11/185310 | |
| DATED | : January 6, 2009 | |
| INVENTOR(S) | : Dragan Tomic et al. | |

It is certified that error appears in the above-identified patent and that said Letters Patent is hereby corrected as shown below:

In column 32, line 8, after "data" insert -- that --.

Signed and Sealed this
Third Day of May, 2011

David J. Kappos
*Director of the United States Patent and Trademark Office*